(12) United States Patent
Fan et al.

(10) Patent No.: US 10,715,295 B2
(45) Date of Patent: *Jul. 14, 2020

(54) METHOD AND APPARATUS FOR ENCODING AND PROCESSING ACKNOWLEDGEMENT INFORMATION

(71) Applicant: HUAWEI TECHNOLOGIES CO., LTD., Shenzhen, Guangdong (CN)

(72) Inventors: Xiaoan Fan, Beijing (CN); Yongxia Lv, Beijing (CN); Xiaofeng Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,523

(22) Filed: Dec. 18, 2018

(65) Prior Publication Data

US 2019/0123880 A1   Apr. 25, 2019

Related U.S. Application Data

(63) Continuation of application No. 15/223,411, filed on Jul. 29, 2016, now Pat. No. 10,171,219, which is a
(Continued)

(30) Foreign Application Priority Data

Jan. 17, 2011  (CN) .......................... 2011 1 0009349
Jul. 22, 2011   (CN) .......................... 2011 1 0206570

(51) Int. Cl.
*H04L 5/00*   (2006.01)
*H04L 1/00*   (2006.01)
(Continued)

(52) U.S. Cl.
CPC .......... *H04L 5/0055* (2013.01); *H04L 1/0073* (2013.01); *H04L 1/1607* (2013.01);
(Continued)

(58) Field of Classification Search
CPC ...................................................... H04L 5/0055
See application file for complete search history.

(56) References Cited

U.S. PATENT DOCUMENTS 7,760,698 B2   7/2010   Chen et al.
9,408,203 B2   8/2016   Fan et al.
(Continued)

FOREIGN PATENT DOCUMENTS

CN    101267284 B    9/2008
CN    101616492 B    12/2009
(Continued)

OTHER PUBLICATIONS

3GPP TS 36.213 V10.0.1, 3rd Generation Partnership Project, Technical Specification Group Radio Access Network; Evolved Universal Terrestrial Radio Access (E-UTRA), Physical layer procedures (Release 10), Dec. 2010, total 98 pages.
(Continued)

*Primary Examiner* — Jason E Mattis
(74) *Attorney, Agent, or Firm* — Gregg L. Jansen

(57) ABSTRACT

A method for encoding acknowledgement information includes: receiving a component carrier, where the component carrier includes at least one downlink subframe; generating acknowledgement information bits corresponding to the component carrier according to the received component carrier; dividing the acknowledgement information bits into two groups so that each group includes at least one acknowledgement information bit, where the at least one acknowledgement information bit corresponds to physical downlink shared channel PDSCH transmission, and/or downlink con-
(Continued)

trol information DCI, where the DCI is used for indicating downlink semi-persistent scheduling SPS release; and encoding the two divided groups of acknowledgement information bits to obtain two groups of codeword bits, respectively, and generating, from the two groups of codeword bits obtained by the encoding, total codeword bits to be transmitted. In addition, a method for receiving acknowledgement information, an apparatus for encoding acknowledgement information, and an apparatus for processing acknowledgement information are also included.

20 Claims, 6 Drawing Sheets

Related U.S. Application Data continuation of application No. 13/944,047, filed on Jul. 17, 2013, now Pat. No. 9,408,203, which is a continuation of application No. PCT/CN2012/070488, filed on Jan. 17, 2012.

(51) Int. Cl.
  *H04L 1/16* (2006.01)
  *H04W 72/04* (2009.01)
  *H04W 72/12* (2009.01)
  *H04L 1/12* (2006.01)

(52) U.S. Cl.
  CPC ..... *H04W 72/042* (2013.01); *H04W 72/1289* (2013.01); *H04L 2001/125* (2013.01)

(56) References Cited

U.S. PATENT DOCUMENTS

| 10,171,219 | B2* | 1/2019 | Fan ................. H04L 1/0073 |
|---|---|---|---|
| 2005/0286402 | A1 | 12/2005 | Byun et al. |
| 2010/0210256 | A1 | 8/2010 | Shen et al. |
| 2010/0227614 | A1 | 9/2010 | Chun et al. |
| 2010/0272048 | A1 | 10/2010 | Pan et al. |
| 2011/0026444 | A1 | 2/2011 | Dai et al. |
| 2011/0142000 | A1 | 6/2011 | Han et al. |
| 2011/0243278 | A1 | 10/2011 | Cheng |
| 2011/0268090 | A1 | 11/2011 | Qu et al. |
| 2011/0274062 | A1 | 11/2011 | Cheng et al. |
| 2012/0039279 | A1 | 2/2012 | Chen et al. |
| 2012/0093040 | A1 | 4/2012 | Wu et al. |
| 2013/0044722 | A1 | 2/2013 | Kang et al. |
| 2013/0136071 | A1 | 5/2013 | Han et al. |
| 2013/0279459 | A1 | 10/2013 | Lee et al. |

FOREIGN PATENT DOCUMENTS

| CN | 101826947 B | 9/2010 |
|---|---|---|
| CN | 101841398 B | 9/2010 |
| CN | 102469506 B | 5/2012 |
| KR | 20110120808 A | 11/2011 |
| RU | 2338326 C2 | 12/2005 |
| RU | 2404543 C2 | 9/2007 |
| WO | 2009120630 A1 | 10/2009 |
| WO | 2010129810 A2 | 11/2010 |
| WO | 2010145481 A1 | 12/2010 |

OTHER PUBLICATIONS

3GPP TS 36.212 V10.0.0; 3rd Generation Partnership Project, Technical Specification Group Radio Access Network; Evolved Universal Terrestrial Radio Access (E-UTRA), Multiplexing and channel coding (Release 10), Dec. 2010; total 72 pages.
3GPP TSG-RAN Meeting #62; R1-105097; Draft Change Request, Introduction of Rel-10 LTE-Advanced features in 36.212; Qualcomm Incorporated; Madrid, Spain, Aug. 23-27, 2010; total 93 pages.
3GPP TSG RAN WG1 meeting #63; R1-106446; Coding and resource mapping for UCI on PUSCH; Source: Huawei, HiSilicon; Agenda Item:6.2.3; Jacksonville, USA, Nov. 15-19, 2010; total 6 pages.
3GPP TSG RAN WG1 meeting #63; R1-106319; Large Payload ACK/NACK Bit Mapping for TDD; Source: Research in Motion; Agenda Item:6.2.1.1; Jacksonville, FL, Nov. 15-19, 2010; total 6 pages.
3GPP TSG RAN WG1 meeting #63; R1-105831; Remaining details on PUCCH format 3 for LTE-A TDD; Source: Huawei, HiSilicon; Agenda Item: 6.2.1.1; Jacksonville,Florida, USA, Nov. 15-19, 2010; total 6 pages.
3GPP TSG RAN WG1 meeting #62 bis; R1-105246; ACK/NACK transmission schemes for TDD in LTE-A; Source: Huawei, HiSilicon; Agenda Item: 6.2.1.1; Xi"an, China, Oct. 11-15, 2010; total 4 pages.

* cited by examiner

METHOD AND APPARATUS FOR ENCODING AND PROCESSING ACKNOWLEDGEMENT INFORMATION

CROSS-REFERENCE TO RELATED APPLICATIONS

This application is a continuation of U.S. patent application Ser. No. 15/223,411, filed on Jul. 29, 2016, which is a continuation of U.S. patent application Ser. No. 13/944,047, filed on Jul. 17, 2013, now U.S. Pat. No. 9,408,203, which is a continuation of International Application No. PCT/CN2012/070488, filed on Jan. 17, 2012, which claims priority to Chinese Patent Application No. 201110206570.2, filed on Jul. 22, 2011, and Chinese Patent Application No. 201110009349.8, filed on Jan. 17, 2011, all of which are hereby incorporated by reference in their entireties.

FIELD OF THE INVENTION

The present invention relates to the field of mobile communication technologies, and in particular, to a method and an apparatus for encoding and processing acknowledgement information, including a method and an apparatus for encoding acknowledgement information, and a method and an apparatus for processing acknowledgement information.

BACKGROUND OF THE INVENTION

In a hybrid automatic repeat request (Hybrid Automatic Repeat Request, HARQ) technology, a data receiver needs to feed back acknowledgement information to a data transmitter to help the data transmitter confirm whether data is received correctly. Usually, an acknowledgement (Acknowledgement, ACK) is used to indicate correct reception, and a negative acknowledgement (Negative-acknowledgement, NACK) is used to indicate incorrect reception. The acknowledgement information may also be called ACK/NACK feedback information. In an uplink (Uplink, UL) direction of a 3rd Generation Partnership Project (3rd Generation Partnership Project, 3GPP) evolved universal terrestrial radio access (Evolved Universal Terrestrial Radio Access, E-UTRA) system, a user equipment feeds back acknowledgement information of downlink data reception to a base station through a physical uplink control channel (Physical Uplink Control Channel, PUCCH). The 3GPP E-UTRA system is also called a long term evolution (Long Term Evolution, LTE) system.

In an LTE-advanced (LTE-Advanced, LTE-A) system, a carrier aggregation technology is selected to be used for supporting wider bandwidth, so as to satisfy the requirement of the International Telecommunication Union for the peak data rate of a fourth generation communication technology. In the carrier aggregation technology, spectrums of two or more component carriers are aggregated to obtain wider transmission bandwidth. For a user equipment of the LTE-A, different quantities of uplink carriers and component carriers may be configured, and each component carrier has an independent HARQ process. When the user equipment of the LTE-A accesses multiple component carriers simultaneously, corresponding acknowledgement information needs to be fed back with respect to the data transmitted on a physical downlink shared channel (Physical Downlink Shared Channel, PDSCH) of each component carrier to the user equipment or downlink control information (Downlink Control Information, DCI) indicating downlink semi-persistent scheduling (Semi-Persistent Scheduling, SPS) release. Furthermore, the acknowledgement information corresponding to the multiple component carriers needs to be fed back in the same uplink component carrier.

In a time division duplex (Time Division Duplexing, TDD) system having multiple component carriers, there is only the concept of component carriers and there is no definite concept of uplink component carriers and downlink component carriers, because both uplink transmission and downlink transmission occur on a same frequency band, that is, each component carrier has both uplink transmission and downlink transmission, to be specific, each component carrier serves as both an uplink component carrier and a downlink component carrier. The uplink transmission and downlink transmission are segmented and staggered only in units of subframes according to time, that is, some subframes are used for downlink transmission and are called downlink subframes (Downlink subframe), and some subframes are used for uplink transmission and are called uplink subframes (Uplink subframe). In addition, there are multiple possible uplink and downlink segmentation modes, and therefore, the number of uplink subframes may be asymmetric to the number of downlink subframes, that is, acknowledgement information corresponding to data transmission on multiple downlink subframes needs to be fed back on a same uplink subframe. That is, feeding back, by the component carrier used for uplink feedback of acknowledgement information, acknowledgement information of downlink subframes on the multiple component carriers, includes: feeding back acknowledgement information corresponding to the data transmission on multiple downlink subframes on each component carrier.

The uplink/downlink subframe configuration in LTE/LTE-A TDD is shown in Table 1, where 'D' indicates a downlink subframe, 'U' indicates an uplink subframe, and 'S' indicates a special subframe, where the special subframe is also mainly used for downlink transmission.

TABLE 1

| Uplink/Downlink Subframe Configuration | Repetition Period | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

During acknowledgement information feedback, for a subframe position of a carrier on which no actual data is transmitted to a user, the user sets several acknowledgement information bits corresponding to the position to preset values during feedback. For example, for the subframe on which no actual data is transmitted to the user, the values of corresponding acknowledgement information bits are set to '0'. However, data is transmitted by the base station to the user, and the user equipment further needs to consume resources (such as power) to feed back the acknowledgement information that is known to the base station and is unnecessary to be fed back, resulting in waste of transmit power and performance loss of the user equipment.

SUMMARY OF THE INVENTION

The present invention provides a method and an apparatus for encoding and processing acknowledgement information, which may reduce power waste and performance loss in comparison with the prior art.

In one aspect, an embodiment of the present invention provides a method for encoding acknowledgement information, including the following steps:

receiving a component carrier, where the component carrier includes at least one downlink subframe; generating acknowledgement information bits corresponding to the component carrier according to the received component carrier;

dividing the acknowledgement information bits into two groups, so that each group includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and encoding the two divided groups of acknowledgement information bits to obtain two groups of codeword bits, respectively, and generating, from the two groups of codeword bits obtained by the encoding, total codeword bits to be transmitted.

In another aspect, an embodiment of the present invention also provides a method for processing acknowledgement information, including the following steps:

receiving total codeword bits which are fed back according to a downlink subframe in a component carrier by a transmitter;

decoding the received total codeword bits according to a set decoding mode to obtain two groups of acknowledgement information bits, where each group of acknowledgement information bits includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and mapping the two groups of acknowledgement information bits to feedback information bits of the downlink subframes to obtain acknowledgement information of the downlink subframe.

In another aspect, an embodiment of the present invention also provides an apparatus for encoding acknowledgement information, where the apparatus is located in a user equipment and includes:

an acknowledgement information generating module, configured to receive a component carrier, where the component carrier includes at least one downlink subframe, and generate acknowledgement information bits corresponding to the component carrier according to the received component carrier;

a grouping module, configured to divide the acknowledgement information bits generated by the acknowledgement information generating module into two groups, so that each group includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and an encoding module, configured to encode the two groups of acknowledgement information bits divided by the grouping module to obtain two groups of codeword bits, respectively, and generate, from the two groups of codeword bits obtained by the encoding, total codeword bits to be transmitted.

In another aspect, an embodiment of the present invention also provides an apparatus for processing acknowledgement information, where the apparatus is located in a base station and includes:

a receiving module, configured to receive total codeword bits which are fed back according to a downlink subframe in a component carrier by a transmitter;

a decoding module, configured to decode the received total codeword bits according to a set decoding mode to obtain two groups of acknowledgement information bits, where each group of acknowledgement information bits includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and a mapping module, configured to map the two groups of acknowledgement information bits obtained by the decoding module to feedback information bits of the downlink subframes to obtain acknowledgement information of the downlink subframe.

In another aspect, the present invention also provides a method for encoding acknowledgement information, including the following steps:

receiving at least one component carrier, where each component carrier in the at least one component carrier includes at least one downlink subframe;

generating acknowledgement information bits corresponding to the each component carrier according to the each component carrier;

ordering the acknowledgement information bits corresponding to the each component carrier according to a maximum value DAI_max of a downlink assignment index DAI field in downlink control information DCI, which is received on the each component carrier and used for controlling physical downlink shared channel PDSCH transmission and/or indicating downlink semi-persistent scheduling SPS release, and a number N_sps of physical downlink shared channels PDSCHs scheduled by semi-persistent scheduling SPS in the at least one downlink subframe;

alternately assigning the ordered acknowledgement information bits corresponding to the each component carrier to two groups, and obtaining two groups of acknowledgement information bits; and encoding the two divided groups of acknowledgement information bits to obtain two groups of codeword bits, respectively, and generating, from the two groups of codeword bits obtained by the encoding, total codeword bits to be transmitted.

In another aspect, the present invention also provides a method for processing acknowledgement information, including the following steps:

receiving, by a receiver, total codeword bits which are fed back by a transmitter;

where, the total codeword bits are generated from two groups of codeword bits, and the two groups of codeword bits are obtained by encoding two groups of acknowledgement information bits by the transmitter, respectively;

where the two groups of acknowledgement information bits are obtained in the following way: receiving, by the transmitter, at least one component carrier, and generating acknowledgement information bits corresponding to each component carrier in the at least one component carrier; ordering the acknowledgement information bits corresponding to the each component carrier according to a maximum value DAI_max of a downlink assignment index DAI field in downlink control information DCI, which is obtained on the each component carrier and used for controlling physical downlink shared channel PDSCH transmission and/or indicating downlink semi-persistent scheduling SPS release, and the number N_sps of physical downlink shared channels PDSCHs scheduled by semi-persistent scheduling SPS in the at least one downlink subframe of the each component carrier; and alternately assigning the ordered acknowledgement information bits corresponding to the each component carrier to two groups;

decoding, by the receiver according to a set decoding mode, the received total codeword bits to obtain the two groups of acknowledgement information bits; and mapping, by the receiver, the two groups of acknowledgement information bits to feedback information bits of the at least one downlink subframe to obtain acknowledgement information of the at least one downlink subframe.

In another aspect, the present invention provides an apparatus for encoding acknowledgement information, including:

an acknowledgement information generating module, configured to receive at least one component carrier, where each component carrier in the at least one component carrier includes at least one downlink subframe, and generate acknowledgement information bits corresponding to the each component carrier according to the each component carrier;

a grouping module, configured to order the acknowledgement information bits corresponding to each component carrier according to a maximum value DAI_max of a downlink assignment index DAI field in downlink control information DCI which is received on each component carrier and used for controlling physical downlink shared channel PDSCH transmission and/or indicating downlink semi-persistent scheduling SPS release, and the number N_sps of physical downlink shared channels PDSCHs scheduled by semi-persistent scheduling SPS in the at least one downlink subframe, alternately assign the ordered acknowledgement information bits corresponding to each component carrier to two groups, and obtain two groups of acknowledgement information bits; and an encoding module, configured to encode the two divided groups of acknowledgement information bits to obtain two groups of codeword bits, respectively, and generate, from the two groups of codeword bits obtained by the encoding, total codeword bits to be transmitted.

In another aspect, the present invention also provides an apparatus for processing acknowledgement information, including:

a receiving module, configured to receive total codeword bits which are fed back by a transmitter;

where, the total codeword bits are generated from two groups of codeword bits, where the two groups of codeword bits are obtained by encoding two groups of acknowledgement information bits by the transmitter, respectively;

where the two groups of acknowledgement information bits are obtained in the following way: receiving, by the transmitter, at least one component carrier, and generating acknowledgement information bits corresponding to each component carrier in the at least one component carrier; ordering the acknowledgement information bits corresponding to the each component carrier according to a maximum value DAI_max of a downlink assignment index DAI field in downlink control information DCI which is obtained on the each component carrier and used for controlling physical downlink shared channel PDSCH transmission and/or indicating downlink semi-persistent scheduling SPS release, and the number N_sps of physical downlink shared channels PDSCHs scheduled by semi-persistent scheduling SPS in the at least one downlink subframe of the each component carrier; and alternately assigning the ordered acknowledgement information bits corresponding to the each component carrier to two groups;

a decoding module, configured to decode, according to a set decoding mode, the received total codeword bits to obtain the two groups of acknowledgement information bits; and a mapping module, configured to map the two groups of acknowledgement information bits to feedback information bits of the at least one downlink subframe to obtain acknowledgement information of the at least one downlink subframe.

As can be seen from the above technical solutions, acknowledgement information bits are divided into two groups so that each group includes at least one acknowledgement information bit corresponding to a really scheduled subframe; then, the two groups of acknowledgement information bits are encoded and combined to obtain codeword bits finally carrying acknowledgement information; in this way, the acknowledgement information corresponding to those really scheduled subframes is evenly assigned to the codeword bits of the acknowledgement information as much as possible to avoid performance loss.

DETAILED DESCRIPTION OF THE EMBODIMENTS

Figure 1:
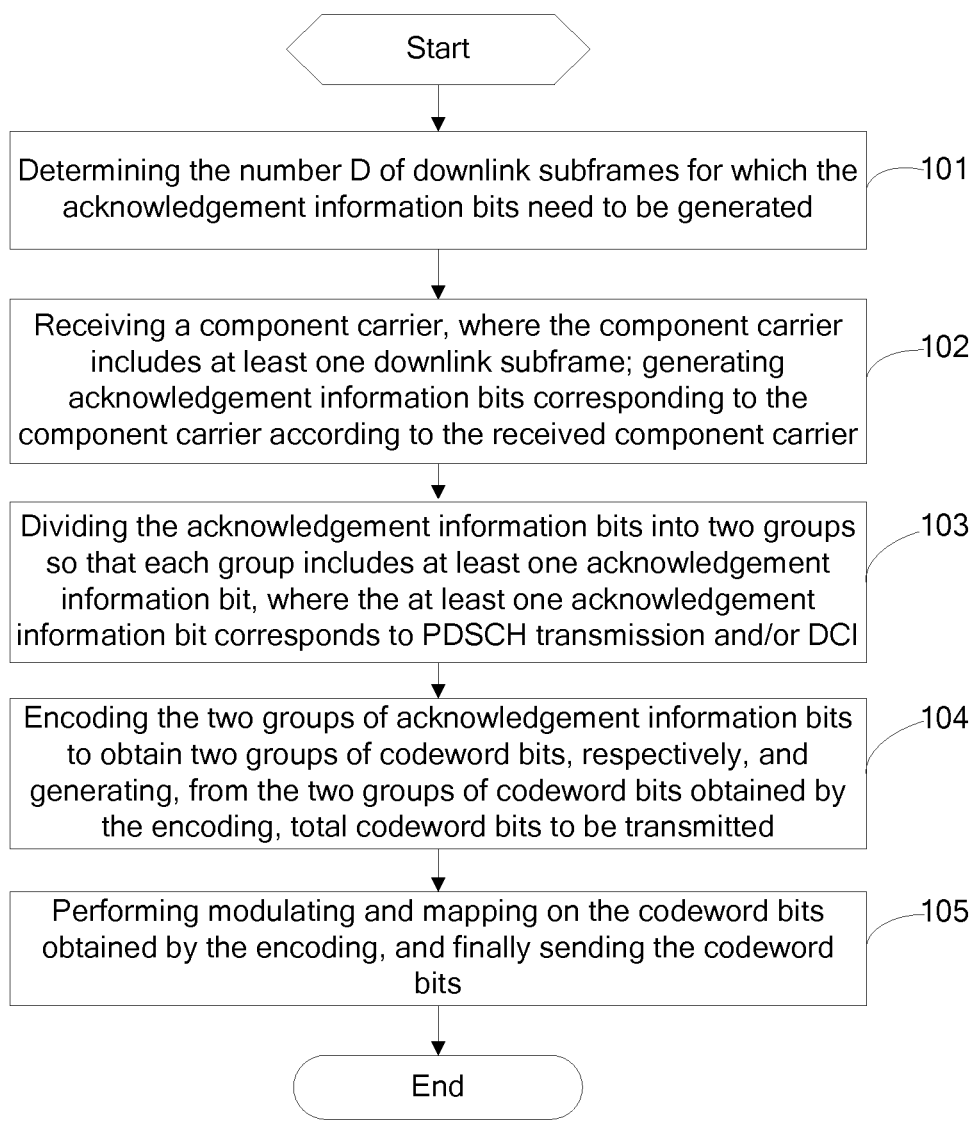
FIG. 1 is a processing flowchart for feeding back acknowledgement information according to a first embodiment of the present invention.

The key of the technical solutions of the present invention is to properly order acknowledgement information bits which are to be transmitted and are corresponding to each downlink subframe on each component carrier, so that acknowledgement information bits corresponding to those subframes having actual data transmission are evenly assigned to two blocks of dual RM codes as much as possible to avoid performance loss.

When acknowledgement information corresponding to data transmission on multiple component carriers needs to be fed back in a same uplink component carrier, there is a problem to be solved: acknowledgement information bits which are to be transmitted and are corresponding to data transmission on each downlink subframe on each component carrier need to be arranged according to a definite sequence, so that after receiving the acknowledgement information bits, a base station can learn the correspondence between acknowledgement information bits and data transmissions of downlink subframes on component carriers, so as to learn whether a data transmission of a downlink subframe on a component carrier is received correctly or not.

To make the present invention more comprehensible to those skilled in the art and make the technical features and technical effects of the technical solutions of the present invention clearer, the following further describes the technical solutions of the present invention in detail with reference to the accompanying drawings and exemplary embodiments.

An embodiment of the present invention provides a method for encoding acknowledgement information, including the following steps:

Step 11: Receive a component carrier, where the component carrier includes at least one downlink subframe; generating acknowledgement information bits corresponding to the component carrier according to the received component carrier;

Step 12: Divide the acknowledgement information bits into two groups so that each group includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and Step 13: Encode the divided two groups of acknowledgement information bits to obtain two groups of codeword bits, respectively, and generate, from the two groups of codeword bits obtained by the encoding, total codeword bits to be transmitted.

Alternatively, before generating acknowledgement information bits of the downlink component carrier, the method further includes:

determining the number D of downlink subframes for which the acknowledgement information bits need to be generated.

Determining the number D of downlink subframes for which the acknowledgement information bits need to be generated includes:

determining the number D of downlink subframes according to the number of downlink subframes associated with a hybrid automatic repeat request HARQ time sequence; or determining the number D of downlink subframes according to a value of a downlink assignment index DAI field in downlink control information DCI for controlling physical uplink shared channel PUSCH transmission.

Generating acknowledgement information bits corresponding to the component carrier according to the received component carrier includes: determining, according to the maximum number of codewords that the component carrier is configured to support in transmission and whether a bundling mode is used between codewords, the bit number a of acknowledgement information bits corresponding to each downlink subframe.

Step 12 may specifically include:

ordering the acknowledgement information bits according to a maximum value DAI_max of a DAI field in received DCI used for controlling PDSCH transmission and/or indicating downlink SPS release and the number N_sps of physical downlink shared channels PDSCHs scheduled by semi-persistent scheduling SPS in the downlink subframes; and alternately assigning the ordered acknowledgement information bits to the two groups.

Ordering the acknowledgement information bits according to the DAI_max and N_sps includes:

placing acknowledgement information bits corresponding to N_sps PDSCHs into first N_sps×a bit positions;

placing acknowledgement information bits corresponding to downlink subframes corresponding to DCI of DAI=1 to DAI=DAI_max into bit positions N_sps×a+1 to N_sps×a+DAI_max×a; and setting the remaining (D×a−(DAI_max+N_sps)×a) acknowledgement information bits to '0';

or placing acknowledgement information bits corresponding to N_sps PDSCHs into last N_sps×a bit positions;

placing acknowledgement information bits corresponding to downlink subframes corresponding to DCI of DAI=1 to DAI=DAI_max into first DAI_max×a bit positions; and setting the remaining (D×a−(DAI_max+N_sps)×a) acknowledgement information bits to '0'.

Alternately assigning the ordered acknowledgement information bits to the two groups includes:

evenly dividing the ordered acknowledgement information bits into D subgroups; and in a first assignment mode, assigning a subgroup having an odd subgroup number to a first group of the two groups, and assigning a subgroup having an even subgroup number to a second group of the two groups;

or in a second assignment mode, assigning a subgroup having an even subgroup number to a first group of the two groups, and assigning a subgroup having an odd subgroup number to a second group of the two groups.

When the component carrier includes multiple carriers, the first assignment mode and the second assignment mode are alternately used for ordered acknowledgement information corresponding to each component carrier according to a set sequence of arranging the component carrier.

Determining the number D of downlink subframes for which the acknowledgement information bits need to be generated further includes: if the determined actual number of downlink subframes is an odd number, adding 1 to the actual number of downlink subframes to obtain a sum used as the number D of downlink subframes.

When the component carrier includes multiple carriers, the D is an odd number, and in the component carriers, the number of component carriers b in which each downlink subframe corresponds to 2 acknowledgement information bits is an odd number, alternately assigning the ordered acknowledgement information bits to the two groups includes: assigning last two acknowledgement information bits of the ordered acknowledgement information bits corresponding to each of the component carriers b to the two groups, respectively; or assigning last two acknowledgement information bits of acknowledgement information bits of a last component carrier b in the component carriers to the two groups, respectively, where the component carriers are arranged according to a set sequence.

Step 12 may specifically include:

according to received DCI used for controlling PDSCH transmission and/or indicating downlink SPS release, assigning acknowledgement information bits corresponding to a downlink subframe corresponding to an odd-number value of a DAI field in the received DCI to a first group of the two groups, and assigning acknowledgement information bits corresponding to a downlink subframe corresponding to an even-number value of the DAI field to a second group of the two groups.

The above method may be implemented by a receiver of a component carrier, for example, a terminal.

Corresponding to the above method for encoding acknowledgement information, a method for processing acknowledgement information is provided by an embodiment of the present invention, including the following steps:

Step 21: Receive total codeword bits which are fed back by a transmitter according to downlink subframes in component carriers;

Step 22: Decode the received total codeword bits according to a set decoding mode to obtain two groups of acknowledgement information bits, where each group of acknowledgement information bits includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and Step 23: Map the two groups of acknowledgement information bits to feedback information bits of the downlink subframes to obtain acknowledgement information of the downlink subframe.

In the feedback information bits of the downlink subframe which are obtained by the mapping:

first $N\_sps \times a$ bit positions store acknowledgement information bits corresponding to $N\_sps$ PDSCHs; and bit positions $N\_sps \times a+1$ to $N\_sps \times a+DAI\_max \times a$ store acknowledgement information bits corresponding to downlink subframes corresponding to DCI of $DAI=1$ to $DAI=DAI\_max$;

or last $N\_sps \times a$ bit positions store acknowledgement information bits corresponding to $N\_sps$ PDSCHs; and first $DAI\_max \times a$ bit positions store acknowledgement information bits corresponding to downlink subframes corresponding to DCI of $DAI=1$ to $DAI=DAI\_max$.

$N\_sps$ is the number of physical downlink shared channels PDSCHs scheduled by semi-persistent scheduling SPS in the downlink subframes, the DCI is used for controlling PDSCH transmission and/or indicating downlink SPS release, the downlink assignment index DAI field is located in the DCI, and a is the bit number of acknowledgement information bits corresponding to each downlink subframe.

Based on the above embodiments for encoding and processing acknowledgement information, a first embodiment of the present invention provides a processing flowchart for feeding back acknowledgement information, as shown in FIG. 1, including the following steps:

Step 101: Determine the number D of downlink subframes for which acknowledgement information bits need to be generated.

In an LTE/LTE-A TDD system, if acknowledgement information bits are fed back on a physical uplink control channel (Physical Uplink Control Channel, PUCCH), the number D of downlink subframes corresponding to the acknowledgement information that needs to be fed back by an uplink subframe may be determined according to the number of downlink subframes corresponding to the acknowledgement information that needs to be fed back by each uplink subframe in Table 4.

In an LTE TDD system, according to an uplink/downlink subframe ratio therein, acknowledgement information corresponding to multiple downlink subframes needs to be fed back by a same uplink subframe. The multiple downlink subframes make up a set of associated downlink subframes, and each downlink subframe in the set of associated downlink subframes is called a downlink subframe associated with the uplink subframe. Assuming that the number of subframes in the set of associated downlink subframes is M, the value of M may be 1, 2, 3, 4, or 9 according to the uplink/downlink subframe ratio.

Specifically, the value of M corresponding to the uplink/downlink subframe configuration in LTE/LTE-A in Table 1 is shown in HARQ Time Sequence Relationship Table 4. In each uplink/downlink subframe configuration, subframes with numbers shown in cells are definitely uplink subframes (referring to FIG. 1), and it may be considered that uplink subframes without numbers do not need to feed back acknowledgement information of any downlink subframe. Moreover, the quantity of the numbers is the number of downlink subframes whose acknowledgement information needs to be fed back by the uplink subframe, that is, the value of M. A value of each number indicates that the downlink subframe that needs to be fed back by the uplink subframe is the downlink subframe preceding the uplink subframe at an interval of the value. For example, the value 6 of subframe 2 in configuration 0 indicates subframe 6 in a previous 10 ms period (the duration of one subframe is 1 ms, and the previous 10 ms period represents a previous group of 10 subframes), and it is learned from Table 1 that subframe 6 is a special subframe for downlink transmission; conversely in other words, the acknowledgement information corresponding to downlink data transmission of the current subframe 6 needs to be fed back by uplink subframe 2 in a next 10 ms period after 6 subframes.

TABLE 4

| Uplink/Downlink Subframe Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Then, in the LTE/LTE-A TDD system, if acknowledgement information bits are fed back on a physical uplink control channel (Physical Uplink Control Channel, PUCCH), an uplink subframe needs to feed back acknowledgement information of all downlink subframes associated with the HARQ time sequence relationship of the uplink subframe.

In LTE-A Release 10, the uplink/downlink subframe configuration of each component carrier in a TDD system is the same. In addition, the maximum number of codewords (codeword) that each carrier is configured to transmit in physical downlink shared channel PDSCH transmission may be different. A carrier can transmit up to 1 codeword, and a carrier can transmit up to 2 codewords.

If the maximum number of codewords that can be transmitted by physical downlink shared channel PDSCH transmission on a carrier is 1 and acknowledgement information of each downlink subframe on the carrier needs to be fed back, 1 acknowledgement information bit is fed back. For example, for the 1 bit, the value '1' indicates correct reception of physical downlink shared channel PDSCH transmission on a downlink subframe or correct reception of downlink control information DCI indicating downlink semi-persistent scheduling SPS release; and the value '0' indicates incorrect reception of physical downlink shared channel PDSCH transmission on the downlink subframe or failure to receive physical downlink shared channel PDSCH transmission on the downlink subframe and/or downlink control information DCI indicating downlink semi-persistent scheduling SPS release.

If the maximum number of codewords that can be transmitted by physical downlink shared channel PDSCH transmission on a carrier is 2 and no spatial bundling (spatial bundling) mode is configured between the two codewords, 1 bit needs to be fed back with respect to each codeword of each downlink subframe on the carrier and a total of 2 acknowledgement information bits $d(0)$ and $d(1)$ are needed. For example, for 1 bit, the value '1' indicates correct reception of one codeword in physical downlink shared channel PDSCH transmission on a downlink subframe; and the value '0' indicates incorrect reception of one codeword in physical downlink shared channel PDSCH transmission on the downlink subframe, or failure to receive data transmission of one codeword, or vice versa. For the other 1 bit, the value '1' indicates correct reception of the other codeword in physical downlink shared channel PDSCH transmission on the downlink subframe; and the value '0' indicates incorrect reception of the other codeword in physical downlink shared channel PDSCH transmission on the downlink subframe, or failure to receive data transmission of the other codeword, or vice versa. For example, $d(0)$ corresponds to the acknowledgement information of a first codeword, and $d(1)$ corresponds to the acknowledgement information of a second codeword. Although a carrier is configured to support up to 2 codewords in physical downlink shared channel PDSCH transmission, in fact, sometimes, only one codeword may be transmitted on a subframe, for example, the subframe is used for physical downlink shared channel PDSCH transmission scheduled by downlink semi-persistent scheduling SPS, or a codeword incorrectly received previously is transmitted on the subframe, or the subframe has no PDSCH transmission, but the subframe has only the DCI corresponding to downlink semi-persistent scheduling SPS (although this case is not completely the same as the codeword concept in the PDSCH, only 1 bit needs to be fed back, which is considered to be equivalent to transmission of one codeword). Generally, for this codeword, $d(0)$ or $d(1)$ is used to feed back acknowledgement information thereof. If it is considered that the other codeword is not received, the other bit $d(1)$ or $d(0)$ is correspondingly set to '0'. Apparently, if PDSCH transmission or DCI indicating downlink semi-persistent scheduling SPS release is not received, the values of the two bits $d(0)$ and $d(1)$ are both '0'.

If the maximum number of codewords that can be transmitted by physical downlink shared channel PDSCH transmission on a carrier is 2 but a spatial bundling mode is configured between the two codewords, only 1 bundled acknowledgement information bit $d(0)$ needs to be fed back with respect to each downlink subframe on the carrier. For example, if the 1 bit is set to '1', it indicates correct reception of all codewords actually transmitted on a downlink subframe. Specifically, if one codeword is transmitted actually (including one codeword in the PDSCH or only the DCI indicating downlink semi-persistent scheduling SPS release), the codeword is received correctly; and if two codewords are transmitted actually, the two codewords are received correctly. If the 1 bit is set to '0', it indicates that at least one of the codewords actually transmitted on the downlink subframe is received incorrectly or that neither of the two codewords is received.

It should be noted that on each downlink subframe, a user can receive only up to one PDSCH transmission or receive up to one piece of DCI indicating downlink SPS release. Therefore, when PDSCH transmission or DCI indicating downlink SPS release is received on a downlink subframe, acknowledgement information is actually feedback about reception of PDSCH transmission or DCI indicating downlink SPS release on the downlink subframe. On the other hand, even if PDSCH transmission or DCI indicating downlink SPS release is not received on a downlink subframe, sometimes, acknowledgement information needs to be fed back with respect to the downlink subframe. Therefore, for ease of description, generally acknowledgement information is described as acknowledgement information corresponding to the downlink subframe. When there is PDSCH transmission or DCI indicating downlink SPS release on the downlink subframe, acknowledgement information corresponding to PDSCH transmission or DCI indicating downlink SPS release is sometimes particularly stressed.

The user equipment finally generates, according to the determined number D of downlink subframes that need to be fed back by an uplink subframe and the number a (a=1 or a=2) of acknowledgement information bits that need to be fed back with respect to each downlink subframe, the total number D×a of acknowledgement information bits that need to be finally fed back with respect to each component carrier.

Step 102: Receive a component carrier, where the component carrier includes at least one downlink subframe; generate acknowledgement information bits corresponding to the component carrier according to the received component carrier.

Specifically, acknowledgement information bits to be fed back with respect to each component carrier may be arranged according to the maximum value of a downlink assignment index (Downlink Assignment Index, DAI) field in downlink control information DCI that is received on each component carrier by a user and is used for controlling physical downlink shared channel PDSCH transmission.

In the LTE system, the base station transmits downlink control information DCI on a physical downlink control channel (Physical Downlink Control Channel, PDCCH) to the UE. The DCI is applied in the following three scenarios:

1. The DCI is used for indicating downlink semi-persistent scheduling (Semi-persistent Scheduling, SPS) release.

2. The DCI is used for controlling dynamic (dynamic) physical downlink shared channel PDSCH transmission.

3. The DCI is used for controlling dynamic (dynamic) physical uplink shared channel (Physical Uplink Shared Channel, PUSCH) transmission.

For PDSCH transmission scheduled in a non-SPS mode (that is, dynamic scheduling), the corresponding DCI and the PDSCH must be available on the same downlink subframe, and if no DCI is received, the corresponding PDSCH cannot be received. For PUSCH transmission scheduled in a non-SPS mode, DCI may be available or unavailable.

In the DCI corresponding to downlink PDSCH transmission or downlink SPS release, a 2-bit DAI command field is introduced and used to indicate the accumulative number of pieces of DCI assigned (or sent) to the user equipment until the current associated downlink subframe in a set of associated downlink subframes and corresponding to downlink PDSCH transmission or downlink SPS release on the associated subframes, where the DCI is used for indicating PDSCH transmission or downlink SPS release. It is hereinafter assumed that the DAI is counted from 1. Counting from other values is similar thereto. It should be noted that the values of 2 bits are '0, 0', '0, 1', '1, 0', and '1, 1'. The values indicated in decimal notation are 0, 1, 2, and 3, respectively. However, in a normal sense, the values indicate 1, 2, 3, and 4. Therefore, when the value of the DAI field is '0, 0', it indicates that up to now, one piece of DCI has been sent to the user, and the rest may be inferred by analogy.

Case 1: It is assumed that the DAI with a maximum value in an associated set received on a carrier by the user is DAI_max. If in the current associated set, there is no PDSCH transmission in SPS scheduling that is not indicated by a DCI, the arrangement mode is that acknowledgement information bits of downlink subframes corresponding to DAI=1 to DAI=DAI_max are arranged at the first DAI_max×a bits of the D×a acknowledgement information bits on the carrier, respectively. The remaining (D×a−DAI_max×a) bits are all set to '0'. Alternatively, the arrangement mode is that acknowledgement information bits of downlink subframes corresponding to DAI=1 to DAI=DAI_max are arranged in reverse order at the last DAI_max×a bits of the D×a acknowledgement information bits on the carrier, respectively. The remaining (D×a−DAI_max×a) bits are all set to '0'.

For example, two component carriers are configured for a user, and 4 downlink subframes of each carrier need to be fed back by one uplink subframe, for example, uplink subframe 2 in uplink/downlink subframe configuration 2 in Table 4. The scheduling on the base station side at the current time is shown in Table 5.

TABLE 5

| Carrier | Subframe | | | |
|---|---|---|---|---|
| | Associated Subframe 1 | Associated Subframe 2 | Associated Subframe 3 | Associated Subframe 4 |
| Carrier 1 (2 codewords) | DAI = 1 | | DAI = 2 | DAI = 3 |
| Carrier 2 (2 codewords) | | DAI = 1 | DAI = 2 | |

The user receives component carriers, and the maximum DAI received on carrier 1 is 3, and the maximum DAI received on carrier 2 is 2. Then, after being ordered according to the first arrangement mode in case 1, the acknowledgement information bits of carrier 1 and carrier 2 are shown in Table 6.

TABLE 6

| Carrier | Bit Position | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Carrier 2 (2 codewords) | DAI = 1 subframe acknowledgement information | DAI = 2 subframe acknowledgement information | 0, 0 | 0, 0 |

Case 2: It is assumed that the DAI with a maximum value in an associated set received on a carrier by the user is DAI_max. If in the current associated set, there is PDSCH transmission in SPS scheduling that is not indicated by a DCI, the arrangement mode is that acknowledgement information bits corresponding to the PDSCH transmission in SPS scheduling that is not indicated by a DCI are arranged at the first 1×a bits of the D×a acknowledgement information bits on the carrier, respectively; then, acknowledgement information bits of downlink subframes corresponding to DAI=1 to DAI=DAI_max are arranged at the next DAI_max×a bits, respectively. The remaining (D×a−(DAI_max+1)×a) bits are all set to '0'. Alternatively, the arrangement mode is that acknowledgement information bits corresponding to the PDSCH transmission in SPS scheduling that is not indicated by a DCI are arranged at the last 1×a bits of the D×a acknowledgement information bits on the carrier, respectively; then, acknowledgement information bits of downlink subframes corresponding to DAI=1 to DAI=DAI_max are arranged at first DAI_max×a bits, respectively. The remaining (D×a−(DAI_max+1)×a) bits are all set to '0'. Alternatively, the arrangement mode is that acknowledgement information bits corresponding to the PDSCH transmission in SPS scheduling that is not indicated by a DCI are arranged at the first 1×a bits of the D×a acknowledgement information bits on the carrier, respectively; then, acknowledgement information bits of downlink subframes corresponding to DAI=1 to DAI=DAI_max are arranged in reverse order at the last DAI_max×a bits, respectively. The remaining (D×a−(DAI_max+1)×a) bits are all set to '0'. Alternatively, acknowledgement information bits corresponding to the PDSCH transmission in SPS scheduling that is not indicated by a DCI are arranged at the last 1×a bits of the D×a acknowledgement information bits on the carrier, respectively; then, acknowledgement information bits of downlink subframes corresponding to DAI=1 to DAI=DAI_max are arranged in reverse order at the next DAI_max×a bits, respectively. The remaining (D×a−(DAI_max+1)×a) bits are all set to '0'.

For example, two component carriers are configured for a user, and 4 downlink subframes of each carrier need to be fed back by one uplink subframe, for example, uplink subframe 2 in uplink/downlink subframe configuration 2 in Table 4; subframe 2 on carrier 1 is configured for PDSCH transmission scheduled by SPS and there is no corresponding DCI. It is assumed that the scheduling on the base station side at the current time is shown in Table 7.

TABLE 7

| | Subframe | | | |
|---|---|---|---|---|
| Carrier | Associated Subframe 1 | Associated Subframe 2 | Associated Subframe 3 | Associated Subframe 4 |
| Carrier 1 (2 codewords) | DAI = 1 | SPS | DAI = 2 | DAI = 3 |

TABLE 7-continued

| | Subframe | | | |
|---|---|---|---|---|
| Carrier | Associated Subframe 1 | Associated Subframe 2 | Associated Subframe 3 | Associated Subframe 4 |
| Carrier 2 (2 codewords) | | DAI = 1 | DAI = 2 | |

The user receives component carriers, and the maximum DAI received on carrier 1 is 3, and the maximum DAI received on carrier 2 is 2. Then, after being ordered according to the first arrangement mode in case 2, the acknowledgement information bits of carrier 1 and carrier 2 are shown in Table 8.

TABLE 8

| | Bit Position | | | |
|---|---|---|---|---|
| Carrier | 2 Bits (1, 2) | 2 Bits (3, 4) | 2 Bits (5, 6) | 2 Bits (7, 8) |
| Carrier 1 (2 codewords) | SPS subframe acknowledgement information | DAI = 1 subframe acknowledgement information | DAI = 2 subframe acknowledgement information | DAI = 3 subframe acknowledgement information |
| Carrier 2 (2 codewords) | DAI = 1 subframe acknowledgement information | DAI = 2 subframe acknowledgement information | 0, 0 | 0, 0 |

Step 103: Divide the acknowledgement information bits into two groups so that each group includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release.

It is assumed that one block in the dual RM code is code block a, [a(0), a(1), a(2) . . . ], and that the other block is code block b, [b(0), b(1), b(2) . . . ]. The ordered acknowledgement information bits in case 1 in the above example are alternately assigned to two code blocks, as shown in Table 9 or Table 10.

TABLE 9

| | Subframe | | | |
|---|---|---|---|---|
| Carrier | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | a(4), a(5) | b(4), b(5) | a(6), a(7) | b(6), b(7) |

TABLE 10

| | Subframe | | | |
|---|---|---|---|---|
| Carrier | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |

TABLE 10-continued

| Carrier | Subframe | | | |
|---|---|---|---|---|
| | 2 Bits (1, 2) | 2 Bits (3, 4) | 2 Bits (5, 6) | 2 Bits (7, 8) |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | b(4), b(5) | a(4), a(5) | b(6), b(7) | a(6), a(7) |

It can be seen that if at least two downlink subframes on a component carrier have actual data transmission, that is, at least two pieces of DCI are sent in associated subframes, either of the two methods for assigning to the dual RM code (Table 9 and Table 10) may ensure that each code block of the dual RM code has acknowledgement information bits of actual data transmission; even if each carrier has only one downlink subframe that has actual data transmission, the method for assigning to the dual RM code as shown in Table 10 may also ensure that each code block has acknowledgement information bits of actual data transmission.

Note: Even if the base station sends one piece of DCI, the user may not correctly receive the DCI. In this case, because the user does not receive any data (the user does not receive PDSCH transmission and/or DCI indicating downlink SPS release), the user actually feeds back '0' or '0, 0' according to the number of acknowledgement information bits to be fed back. For example, in the scheduling in the example in case 1, the base station sends one piece of DCI with the DAI field being 2 in subframe 3 of carrier 1, but the user does not receive the DCI, and only receives DCI of DAI=1 and DAI=3. Apparently, the user learns that intermediate DCI of DAI=2 is not received. However, this has no impact, and the user occupies the first 3 positions according to 3 because the user learns the maximum DAI=3. Moreover, the user sets bits in positions between DAI=1 and DAI=3 to '0' or '0, 0'. It should be further noted that if data transmission is sent by the base station but not received by the user, because the base station is unable to learn in advance that the user does not receive the data transmission sent by the base station, the corresponding acknowledgement information bits still belong to acknowledgement information of actual data transmission. The base station does not learn whether the data transmission is correctly received, or is incorrectly received, or is completely not received, until the base station receives the corresponding acknowledgement information bits. In other words, the acknowledgement information '0' or '0, 0' is different from the acknowledgement information '0' or '0, 0' of a subframe on which the base station actually sends no data. The base station does not learn that the former is definitely '0' or '0, 0', but the base station learns that the latter is definitely is '0' or '0, 0'.

In addition, in alternate assignment, assignment may be based on granularity of a bit, that is, the object assigned at each time is 1 bit. It is assumed that one block in the dual RM code dual RM code is code block a, [a(0), a(1), a(2) . . . ], and that the other block is code block b, [b(0), b(1), b(2) . . . ]. The ordered acknowledgement information bits in case 1 in the above example are alternately assigned to two code blocks, as shown in Table X1 or Table X2.

TABLE X1

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Alternate Assignment | a(0), b(0) | a(1), b(1) | a(2), b(2) | a(3), b(3) |
| Carrier 2 (2 codewords) | DAI = 1 subframe acknowledgement information | DAI = 2 subframe acknowledgement information | 0, 0 | 0, 0 |
| Alternate Assignment | a(4), b(4) | a(5), b(5) | a(6), b(6) | a(7), b(7) |

TABLE X2

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Alternate Assignment | a(0), b(0) | a(1), b(1) | a(2), b(2) | a(3), b(3) |

TABLE X2-continued

|  | Subframe | | | |
|---|---|---|---|---|
| Carrier | 2 Bits (1, 2) | 2 Bits (3, 4) | 2 Bits (5, 6) | 2 Bits (7, 8) |
| Carrier 2 (2 codewords) | DAI = 1 subframe acknowledgement information | DAI = 2 subframe acknowledgement information | 0, 0 | 0, 0 |
| Alternate Assignment | b(4), a(4) | b(5), a(5) | b(6), a(6) | b(7), a(7) |

It is assumed that one block in the dual RM code dual RM code is code block a, [a(0), a(1), a(2) . . . ], and that the other block is code block b, [b(0), b(1), b(2) . . . ]. The ordered acknowledgement information bits in case 2 in the above example are alternately assigned to two code blocks, as shown in Table 11 or Table 12.

TABLE 11

|  | Subframe | | | |
|---|---|---|---|---|
| Carrier | 2 Bits (1, 2) | 2 Bits (3, 4) | 2 Bits (5, 6) | 2 Bits (7, 8) |
| Carrier 1 (2 codewords) | SPS subframe acknowledgement information | DAI = 1 subframe acknowledgement information | DAI = 2 subframe acknowledgement information | DAI = 3 subframe acknowledgement information |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | a(4), a(5) | b(4), b(5) | a(6), a(7) | b(6), b(7) |

TABLE 12

|  | Subframe | | | |
|---|---|---|---|---|
| Carrier | 2 Bits (1, 2) | 2 Bits (3, 4) | 2 Bits (5, 6) | 2 Bits (7, 8) |
| Carrier 1 (2 codewords) | SPS subframe acknowledgement information | DAI = 1 subframe acknowledgement information | DAI = 2 subframe acknowledgement information | DAI = 3 subframe acknowledgement information |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | b(4), b(5) | a(4), a(5) | b(6), b(7) | a(6), a(7) |

It can be seen that if at least two downlink subframes on a component carrier have actual data transmission, that is, the sum of the number of pieces of DCI and the number of PDSCHs scheduled by SPS which are sent in associated subframes is at least 2, either of the two methods for assigning to the dual RM code (Table 11 and Table 12) may ensure that each code block of the dual RM code has acknowledgement information bits of actual data transmission; even if each carrier has only one downlink subframe that has actual data transmission, the method for assigning to the dual RM code as shown in Table 12 may also ensure that each code block has acknowledgement information bits of actual data transmission.

Step 104: Encode the two divided groups of acknowledgement information bits to obtain two groups of codeword bits, respectively, and generate, from the two groups of codeword bits obtained by the encoding, total codeword bits to be transmitted.

When acknowledgement information corresponding to data transmission on multiple component carriers needs to be fed back by a same uplink component carrier, the uplink acknowledgement information is transmitted on a PUCCH by using a transmission format 3 (format 3). In this format, 48 codeword bits need to be transmitted, that is, 48 codeword bits need to be generated by using a particular coding mode from the acknowledgement information bits to be transmitted, and then, the acknowledgement information bits can be transmitted in format 3. In particular, the specific coding mode in the TDD system is as follows:

(1) When the number of acknowledgement information bits to be transmitted is not greater than 11 bits, the (32, O)

RM (Reed-Muller) coding in LTE release 8 is used to generate 32 bits first, and then, this process is repeated until 48 codeword bits are obtained.

(2) When the number of acknowledgement information bits to be transmitted is greater than 11 bits, the acknowledgement information bits to be transmitted are evenly divided into two groups first. Specifically, if the number of acknowledgement information bits to be transmitted is an even number, the number of bits in the two groups is the same; if the number of acknowledgement information bits to be transmitted is an odd number, one group has one bit more than the other group. Then, (32, O) RM coding in LTE release 8 is used to encode each group to generate 32 bits first, and then, the last 8 bits of the 32 bits are removed to obtain 24 codeword bits. In this way, a total of 48 codeword bits are obtained in the two groups. This coding method is hereinafter called dual RM coding (dual RM code/coding).

(32, O) RM coding is shown in Table 13. The specific coding mode is as follows: 32 codeword bits $b_j$ are obtained according to formula (1), $$b_j = \left[\sum_{n=0}^{A-1} (a_n \cdot M_{j,n})\right] \bmod 2 \quad (1)$$

where, $M_{j,n}$ is a corresponding element in Coding Matrix Table 13, where j=0, 1, . . . , 31; $a_n$ is an $n^{th}$ information bit in an information bit sequence that needs to be encoded and has a length of A, where n=0, . . . A−1.

TABLE 13

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Step 105: Perform scrambling, modulating, and mapping on the codeword bits obtained by encoding, and finally send the codeword bits.

Specifically, PUCCH format 3 is used for sending, and operations such as scrambling (scrambling), modulating (modulate), and mapping (mapping) may be performed according to the corresponding requirements of format 3. Details are omitted herein.

Figure 2:
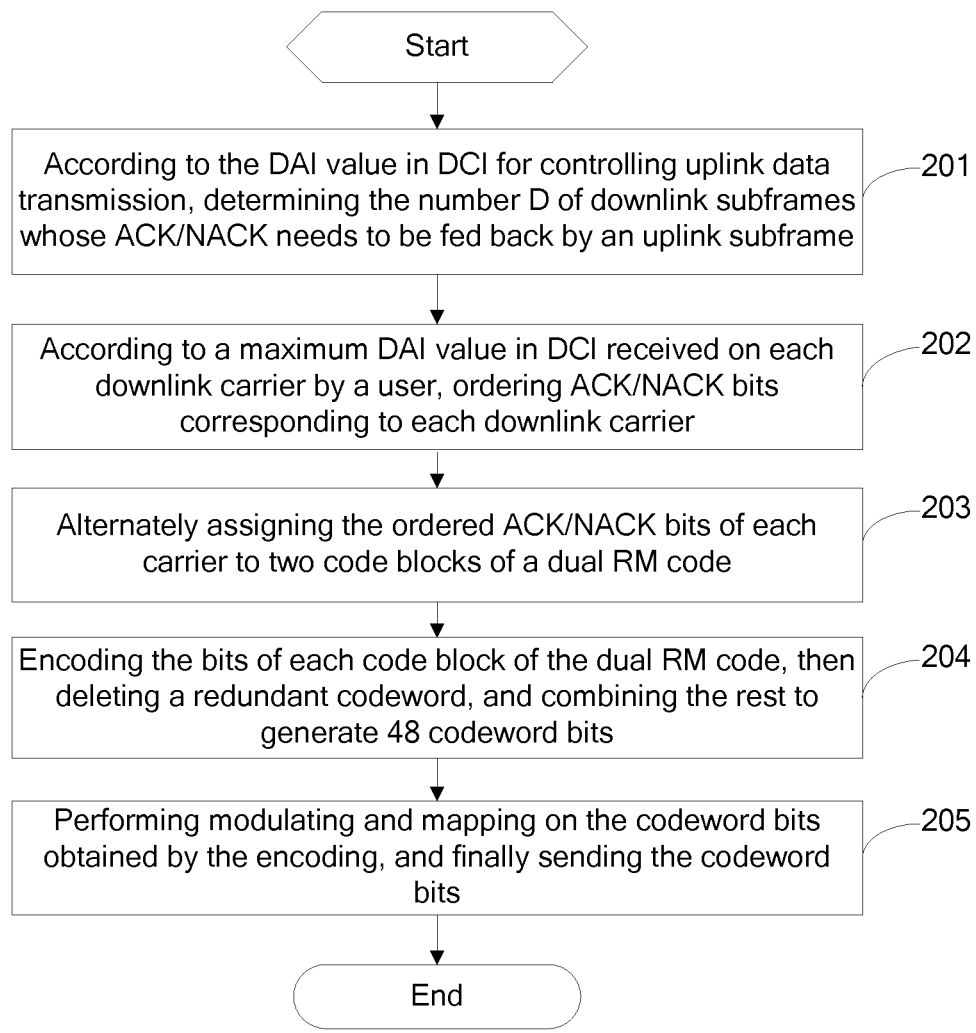
FIG. 2 is a processing flowchart for feeding back acknowledgement information according to a second embodiment of the present invention.

A second embodiment of the present invention provides a processing flowchart for feeding back acknowledgement information, as shown in FIG. 2, including the following steps:

Step 201: According to the DAI value in DCI for controlling uplink data transmission, determine the number D of downlink subframes whose acknowledgement information needs to be fed back by an uplink subframe.

In an LTE/LTE-A system, if acknowledgement information is fed back on a PUSCH, the corresponding DCI may be available or unavailable as described above. If a user does not receive DCI for controlling PUSCH transmission, the number D of downlink subframes whose acknowledgement information needs to be fed back by an uplink subframe is still determined by the HARQ time sequence relationship in the first embodiment. If the user receives DCI for controlling PUSCH transmission, the DCI also has a DAI field. In an LTE/LTE-A single-carrier system (only one component carrier is available), the DAI field is used to indicate the total number of pieces of DCI, sent in associated downlink subframes, for controlling PDSCH and/or indicating downlink SPS release. Note: The difference between the DAI field in DCI for controlling PUSCH transmission and the DAI field in DCI for controlling PDSCH and/or indicating downlink SPS release lies in that the DAI field in DCI for controlling PDSCH and/or indicating downlink SPS release is used as a counter, while the DAI field in DCI for controlling PUSCH transmission indicates the total number.

In an LTE-A carrier aggregation system, the DAI field in DCI for controlling PUSCH transmission is used to indicate a maximum value of the total number of pieces of DCI that is sent in associated downlink subframes on each carrier and is for PDSCH transmission and/or indicating downlink SPS release. In addition, the DAI field (if any) in DCI for controlling PUSCH transmission on each carrier is used to indicate a maximum value of the total number of pieces of DCI that is sent in associated downlink subframes on the carrier and is for controlling PDSCH transmission and/or indicating downlink SPS release, that is, the values are the same. For example, 3 pieces of DCI in total are transmitted on carrier 1 and there is one PDSCH transmission scheduled by SPS (that is, without DCI control), while 2 pieces of DCI are transmitted on carrier 2, the value of the DAI field in the DCI for controlling PUSCH transmission is a maximum value 4 thereof.

Therefore, if acknowledgement information is fed back on a PUSCH, and at least one piece of DCI for controlling PUSCH transmission is received, the number of downlink subframes whose acknowledgement information needs to be fed back by an uplink subframe may be determined according to the value of the DAI field in DCI for controlling PUSCH transmission.

If there is no DCI, the number of subframes fed back may also be determined according to the number of associated subframes determined by the HARQ time sequence.

Step 202: According to the maximum value of a downlink assignment index (Downlink Assignment Index, DAI) field in downlink control information DCI that is received on each component carrier by the user and used for controlling physical downlink shared channel PDSCH transmission, order acknowledgement information bits to be fed back with respect to each component carrier.

In the LTE system, the base station transmits downlink control information DCI on a physical downlink control channel (Physical Downlink Control Channel, PDCCH) to a UE. The DCI is applied in the following three scenarios:

1. The DCI is used for indicating downlink semi-persistent scheduling (Semi-persistent Scheduling, SPS) release.
2. The DCI is used for controlling dynamic (dynamic) physical downlink shared channel PDSCH transmission.
3. The DCI is used for controlling dynamic (dynamic) physical uplink shared channel (Physical Uplink Shared Channel, PUSCH) transmission.

For PDSCH transmission scheduled in a non-SPS mode (that is, dynamic scheduling), the corresponding DCI and the PDSCH must be available on the same downlink subframe, and if no DCI is received, the corresponding PDSCH cannot be received. For PUSCH transmission scheduled in a non-SPS mode, DCI may be available or unavailable.

In the DCI corresponding to downlink PDSCH transmission or downlink SPS release, a 2-bit DAI command field is introduced and is used to indicate the accumulative number of pieces of DCI assigned (or sent) to the user equipment until the current associated downlink subframe in a set of associated downlink subframes and corresponding to downlink PDSCH transmission or downlink SPS release on the associated subframes, where the DCI is used for indicating PDSCH transmission or downlink SPS release. It is hereinafter assumed that the DAI is counted from 1. Counting from other values is similar thereto. It should be noted that the values of 2 bits are '0, 0', '0, 1', '1, 0', and '1, 1'. The values indicated in binary notation are 0, 1, 2, and 3, respectively. However, in a normal sense, the values indicate 1, 2, 3, and 4. Therefore, when the value of the DAI field is '0, 0', it indicates that up to now, one piece of DCI has been sent to the user, and the rest may be inferred by analogy.

Case 1: It is assumed that the DAI with a maximum value in an associated set received on a carrier by the user is DAI_max. If in the current associated set, there is no PDSCH transmission in SPS scheduling that is not indicated by a DCI, the arrangement mode is that acknowledgement information bits of downlink subframes corresponding to DAI=1 to DAI=DAI_max are arranged at the first DAI_max×a bits of the D×a acknowledgement information bits on the carrier, respectively. The remaining (D×a−DAI_max×a) bits are all set to '0'. Alternatively, the arrangement mode is that acknowledgement information bits of downlink subframes corresponding to DAI=1 to DAI=DAI_max are arranged in reverse order at the last DAI_max×a bits of the D×a acknowledgement information bits on the carrier, respectively. The remaining (D×a−DAI_max×a) bits are all set to '0'.

For example, two component carriers are configured for a user, and 4 downlink subframes of each carrier need to be fed back by one uplink subframe, for example, uplink subframe 2 in uplink/downlink subframe configuration 2 in Table 4. The scheduling on the base station side at the current time is shown in Table 14, and the base station has sent at least one piece of DCI for controlling PUSCH transmission. According to the scheduling in Table 14, the value of the DAI is a maximum value 3 of 3 and 2.

TABLE 14

| | Subframe | | | |
|---|---|---|---|---|
| Carrier | Associated Subframe 1 | Associated Subframe 2 | Associated Subframe 3 | Associated Subframe 4 |
| Carrier 1 (2 codewords) | DAI = 1 | | DAI = 2 | DAI = 3 |
| Carrier 2 (2 codewords) | | DAI = 1 | DAI = 2 | |

The user receives component carriers, and the maximum DAI received on carrier 1 is 3, and the maximum DAI received on carrier 2 is 2. At least one piece of DCI for controlling PUSCH transmission and a DAI field in the DCI are received. The number of downlink subframes whose acknowledgement information needs to be fed back by an uplink subframe is determined as D=3. After being ordered according to the first arrangement mode in case 1, the acknowledgement information bits of carrier 1 and carrier 2 are shown in Table 15.

TABLE 15

| | Bit Position | | |
|---|---|---|---|
| Carrier | 2 Bits (1, 2) | 2 Bits (3, 4) | 2 Bits (5, 6) |
| Carrier 1 (2 codewords) | DAI = 1 subframe acknowledgement information | DAI = 2 subframe acknowledgement information | DAI = 3 subframe acknowledgement information |
| Carrier 2 (2 codewords) | DAI = 1 subframe acknowledgement information | DAI = 2 subframe acknowledgement information | 0, 0 |

Case 2: It is assumed that the DAI with a maximum value in an associated set received on a carrier by the user is DAI_max. If in the current associated set, there is PDSCH transmission in SPS scheduling that is not indicated by a DCI, the arrangement mode is that acknowledgement information bits corresponding to the PDSCH transmission that does not use DCI for indicating SPS scheduling are arranged at the first 1×a bits of the D×a acknowledgement information bits on the carrier, respectively; then, acknowledgement information bits of downlink subframes corresponding to DAI=1 to DAI=DAI_max are arranged at the next DAI_max×a bits, respectively. The remaining (D×a−(DAI_max+1)×a) bits are all set to '0'. Alternatively, the arrangement mode is that acknowledgement information bits corresponding to the PDSCH transmission in SPS scheduling that is not indicated by a DCI are arranged at the last 1×a bits of the D×a acknowledgement information bits on the carrier, respectively; then, acknowledgement information bits of downlink subframes corresponding to DAI=1 to DAI=DAI_max are arranged at first DAI_max×a bits, respectively. The remaining (D×a−(DAI_max+1)×a) bits are all set to '0'. Alternatively, the arrangement mode is that acknowledgement information bits corresponding to the PDSCH transmission in SPS scheduling that is not indicated by a DCI are arranged at the first 1×a bits of the D×a acknowledgement information bits on the carrier, respectively; then, acknowledgement information bits of downlink subframes corresponding to DAI=1 to DAI=DAI_max are arranged in reverse order at the last DAI_max×a bits, respectively. The remaining (D×a−(DAI_max+1)×a) bits are all set to '0'. Alternatively, acknowledgement information bits corresponding to the PDSCH transmission in SPS scheduling that is not indicated by a DCI are arranged at the last 1×a bits of the D×a acknowledgement information bits on the carrier; then, acknowledgement information bits of downlink subframes corresponding to DAI=1 to DAI=DAI_max are arranged in reverse order at the next DAI_max×a bits, respectively. The remaining (D×a−(DAI_max+1)×a) bits are all set to '0'.

For example, two component carriers are configured for a user, and 4 downlink subframes of each carrier need to be fed back by one uplink subframe, for example, uplink subframe 2 in uplink/downlink subframe configuration 2 in Table 4. The scheduling on the base station side at the current time is shown in Table 16, and the base station has sent at least one piece of DCI for controlling PUSCH transmission. According to the scheduling in Table 16, the value of the DAI is a maximum value 4 of 4 and 2.

TABLE 16

| Carrier | Subframe | | | |
| | Associated Subframe 1 | Associated Subframe 2 | Associated Subframe 3 | Associated Subframe 4 |
|---|---|---|---|---|
| Carrier 1 (2 codewords) | DAI = 1 | SPS | DAI = 2 | DAI = 3 |
| Carrier 2 (2 codewords) |  | DAI = 1 | DAI = 2 |  |

The user receives component carriers, and the maximum DAI received on carrier 1 is 3, and the maximum DAI received on carrier 2 is 2. At least one piece of DCI for controlling PUSCH transmission and a DAI field in the DCI are received. The number of downlink subframes whose acknowledgement information needs to be fed back by an uplink subframe is determined as D=3. After being ordered according to the first arrangement mode in case 2, the acknowledgement information bits of carrier 1 and carrier 2 are shown in Table 17.

TABLE 17

| Carrier | Bit Position | | | |
| | 2 Bits (1, 2) | 2 Bits (3, 4) | 2 Bits (5, 6) | 2 Bits (7, 8) |
|---|---|---|---|---|
| Carrier 1 (2 codewords) | SPS subframe acknowledgement information | DAI = 1 subframe acknowledgement information | DAI = 2 subframe acknowledgement information | DAI = 3 subframe acknowledgement information |
| Carrier 2 (2 codewords) | DAI = 1 subframe acknowledgement information | DAI = 2 subframe acknowledgement information | 0, 0 | 0, 0 |

Step 203: Alternately assign the ordered acknowledgement information bits of each component carrier to two code blocks of a dual RM code dual RM code.

It is assumed that one block in the dual RM code dual RM code is code block a, [a(0), a(1), a(2) . . . ], and that the other block is code block b, [b(0), b(1), b(2) . . . ]. The ordered acknowledgement information bits in case 1 in the above example are alternately assigned to two code blocks, as shown in Table 18 or Table 19.

TABLE 18

| Carrier | Subframe | | |
| | 2 Bits (1, 2) | 2 Bits (3, 4) | 2 Bits (5, 6) |
|---|---|---|---|
| Carrier 1 (2 codewords) | DAI = 1 subframe acknowledgement information | DAI = 2 subframe acknowledgement information | DAI = 3 subframe acknowledgement information |
| Alternate Assignment | a(0), a(1) | b(0), b(1) | a(2), a(3) |
| Carrier 2 (2 codewords) | DAI = 1 subframe acknowledgement information | DAI = 2 subframe acknowledgement information | 0, 0 |
| Alternate Assignment | a(4), a(5) | b(2), b(3) | a(6), a(7) |

TABLE 19

| Carrier | Subframe | | |
| | 2 Bits (1, 2) | 2 Bits (3, 4) | 2 Bits (5, 6) |
|---|---|---|---|
| Carrier 1 (2 codewords) | DAI = 1 subframe acknowledgement information | DAI = 2 subframe acknowledgement information | DAI = 3 subframe acknowledgement information |
| Alternate Assignment | a(0), a(1) | b(0), b(1) | a(2), a(3) |
| Carrier 2 (2 codewords) | DAI = 1 subframe acknowledgement information | DAI = 2 subframe acknowledgement information | 0, 0 |

TABLE 19-continued

| Carrier | Subframe | | |
|---|---|---|---|
| | 2 Bits (1, 2) | 2 Bits (3, 4) | 2 Bits (5, 6) |
| Alternate Assignment | b(2), b(3) | a(4), a(5) | b(4), b(5) |

It can be seen that if at least two downlink subframes on a component carrier have actual data transmission, that is, at least two pieces of DCI are sent in associated subframes, either of the two methods for assigning to the dual RM code (Table 18 and Table 19) may ensure that each code block of the dual RM code has acknowledgement information bits of actual data transmission; even if each carrier has only one downlink subframe that has actual data transmission, the method for assigning to the dual RM code as shown in Table 19 may also ensure that each code block has acknowledgement information bits of actual data transmission. In addition, when the number D of subframes is an odd number, the bits of the two code blocks ordered according to Table 19 are more close.

Note: Even if the base station sends one piece of DCI, the user may not correctly receive the DCI. In this case, because the user does not receive any data (the user does not receive PDSCH transmission and/or DCI indicating downlink SPS release), the user actually feeds back '0' or '0, 0' according to the number of acknowledgement information bits to be fed back. For example, in the scheduling in the example in case 1, the base station sends one piece of DCI with the DAI field being 2 in subframe 3 of carrier 1, but the user does not receive the DCI, and only receives DCI of DAI=1 and DAI=3. Apparently, the user learns that intermediate DCI of DAI=2 is not received. However, this has no impact, and the user occupies the first 3 positions according to 3 because the user learns the maximum DAI=3. Moreover, the user sets bits in positions between DAI=1 and DAI=3 to '0' or '0, 0'. It should be further noted that if data transmission is sent by the base station but not received by the user, because the base station is unable to learn in advance that the user does not receive the data transmission sent by the base station, the corresponding acknowledgement information bits still belong to acknowledgement information of actual data transmission. The base station does not learn whether the data transmission is correctly received, or is incorrectly received, or is completely not received, until the base station receives the corresponding acknowledgement information bits. In other words, the acknowledgement information '0' or '0, 0' is different from the acknowledgement information '0' or '0, 0' of a subframe on which the base station actually sends no data. The base station does not learn that the former is definitely '0' or '0, 0', but the base station learns that the latter is definitely is '0' or '0, 0'.

It is assumed that one block in the dual RM code dual RM code is code block a, [a(0), a(1), a(2) . . . ], and that the other block is code block b, [b(0), b(1), b(2) . . . ]. The ordered acknowledgement information bits in case 2 in the above example are alternately assigned to two code blocks, as shown in Table 20 or Table 21.

TABLE 20

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | SPS subframe acknowledgement information | DAI = 1 subframe acknowledgement information | DAI = 2 subframe acknowledgement information | DAI = 3 subframe acknowledgement information |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | a(4), a(5) | b(4), b(5) | a(6), a(7) | b(6), b(7) |

TABLE 21

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | SPS subframe acknowledgement information | DAI = 1 subframe acknowledgement information | DAI = 2 subframe acknowledgement information | DAI = 3 subframe acknowledgement information |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | b(4), b(5) | a(4), a(5) | b(6), b(7) | a(6), a(7) |

It can be seen that if at least two downlink subframes on a component carrier have actual data transmission, that is, the sum of the number of pieces of DCI and the number of PDSCHs scheduled by SPS which are sent in associated subframes is at least 2, either of the two methods for assigning to the dual RM code (Table 20 and Table 21) may ensure that each code block of the dual RM code has acknowledgement information bits of actual data transmission; even if each carrier has only one downlink subframe that has actual data transmission, the method for assigning to the dual RM code as shown in Table 21 may also ensure that each code block has acknowledgement information bits of actual data transmission.

Step 204: Perform encoding and rate matching on bits of each code block of the dual RM code.

When acknowledgement information is fed back on a PUSCH, operations such as encoding and rate matching are performed according to the corresponding requirements of transmission on the PUSCH, and details are omitted herein.

Step 205: Perform scrambling, modulating, and mapping on the codeword bits obtained by encoding, and finally send the codeword bits.

Specifically, PUCCH format 3 is used for sending, and operations such as scrambling (scrambling), modulating (modulate), and mapping (mapping) may be performed according to the corresponding requirements of format 3. Details are omitted herein.

The difference between the second embodiment and the first embodiment lies in that different modes are used for determining the number of downlink subframes.

Figure 3A:
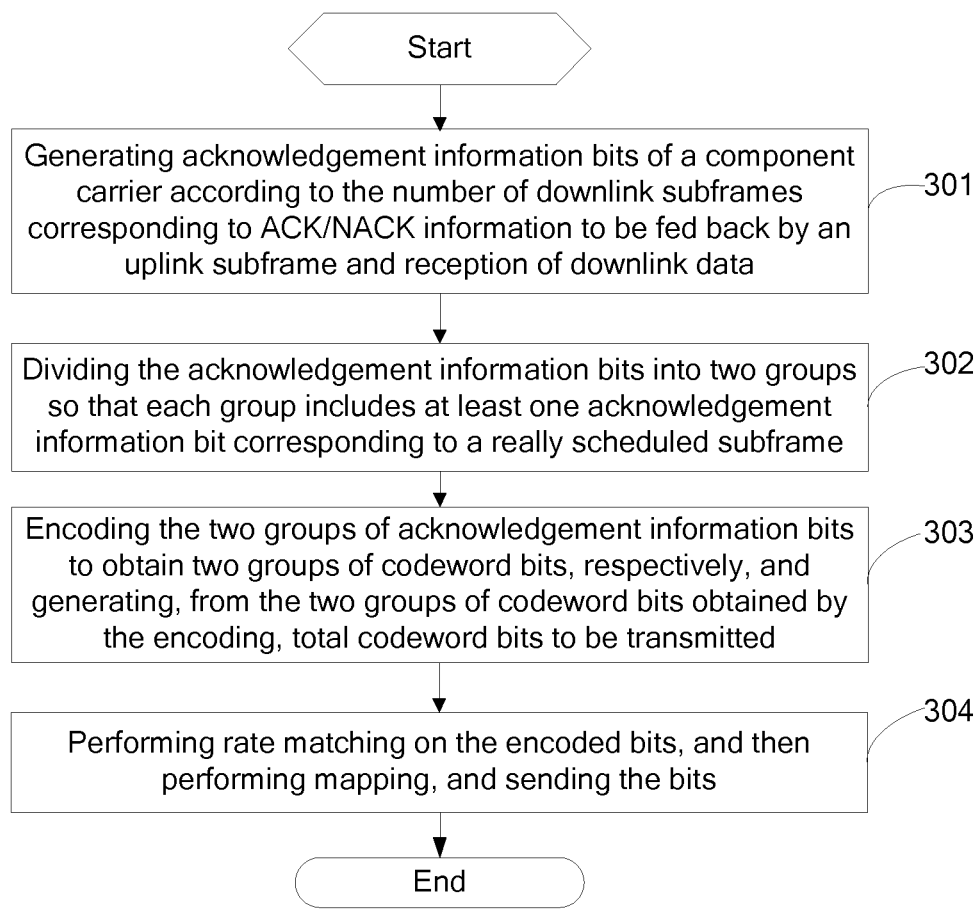
FIG. 3a is a processing flowchart for feeding back acknowledgement information according to a third embodiment of the present invention.

A third embodiment of the present invention provides a processing flowchart for feeding back acknowledgement information, as shown in FIG. 3a, including the following steps:

Step 301: Generate acknowledgement information bits of a component carrier according to the number of downlink subframes corresponding to acknowledgement information to be fed back by an uplink subframe and reception of downlink data.

The number D of downlink subframes corresponding to acknowledgement information to be fed back by the uplink subframe may be determined by using the method of the first embodiment according to the number of associated downlink subframes determined by various HARQ time sequence relationships in Uplink/Downlink Configuration Table 4, or determined by using the method of the second embodiment according to the value of the DAI field in DCI for controlling PUSCH transmission, or the number D of downlink subframes may be determined in other manners, for example, the information is configured directly. No limitation is set forth by the present invention.

Generating acknowledgement information bits includes: determining the acknowledgement information bits according to the reception of the component carrier and whether a bundling mode is used between codewords.

Specifically, if the maximum number of codewords that can be transmitted by physical downlink shared channel PDSCH transmission on a carrier is 1 and acknowledgement information of each downlink subframe on the carrier needs to be fed back, 1 acknowledgement information bit is fed back. For example, for the 1 bit, the value '1' indicates correct reception of physical downlink shared channel PDSCH transmission on a downlink subframe or correct reception of downlink control information DCI indicating downlink semi-persistent scheduling SPS release; and the value '0' indicates incorrect reception of physical downlink shared channel PDSCH transmission on the downlink subframe or failure to receive physical downlink shared channel PDSCH transmission on the downlink subframe and/or downlink control information DCI indicating downlink semi-persistent scheduling SPS release.

If the maximum number of codewords that can be transmitted by physical downlink shared channel PDSCH transmission on a carrier is 2 and no spatial bundling (spatial bundling) mode is configured between the two codewords, 1 bit needs to be fed back with respect to each codeword of each downlink subframe on the carrier and a total of 2 acknowledgement information bits d(0) and d(1) are needed. For example, for 1 bit of the 2 bits, the value '1' indicates correct reception of one codeword in physical downlink shared channel PDSCH transmission on a downlink subframe; and the value '0' indicates incorrect reception of one codeword in physical downlink shared channel PDSCH transmission on the downlink subframe, or failure to receive data transmission of one codeword, or vice versa. For the other 1 bit, the value '1' indicates correct reception of the other codeword in physical downlink shared channel PDSCH transmission on the downlink subframe; and the value '0' indicates incorrect reception of the other codeword in physical downlink shared channel PDSCH transmission on the downlink subframe, or failure to receive data transmission of the other codeword, or vice versa. For example, d(0) corresponds to the acknowledgement information of a first codeword, and d(1) corresponds to the acknowledgement information of a second codeword. Although a carrier is configured to support up to 2 codewords in physical downlink shared channel PDSCH transmission, in fact, sometimes, only one codeword may be transmitted on a subframe, for example, the subframe is used for physical downlink shared channel PDSCH transmission scheduled by downlink semi-persistent scheduling SPS, or a codeword incorrectly received previously is transmitted on the subframe, or the subframe has no PDSCH transmission, but the subframe has only the DCI corresponding to downlink semi-persistent scheduling SPS (although this case is not completely the same as the codeword concept in the PDSCH, only 1 bit needs to be fed back, which is considered to be equivalent to transmission of one codeword). Generally, for this codeword, d(0) or d(1) is used to feed back acknowledgement information thereof. If it is considered that the other codeword is not received, the other bit d(1) or d(0) is correspondingly set to '0'. Apparently, if PDSCH transmission or DCI indicating downlink semi-persistent scheduling SPS release is not received, the values of the two bits d(0) and d(1) are both set to '0'.

If the maximum number of codewords that can be transmitted by physical downlink shared channel PDSCH transmission on a carrier is 2 but a spatial bundling mode is configured between the two codewords, only 1 bundled acknowledgement information bit d(0) needs to be fed back with respect to each downlink subframe on the carrier. For example, if the 1 bit is set to '1', it indicates correct reception of all codewords actually transmitted on a downlink subframe. Specifically, if one codeword is transmitted actually (including one codeword in the PDSCH or only the DCI indicating downlink semi-persistent scheduling SPS release), the codeword is received correctly; and if two codewords are transmitted actually, the two codewords are received correctly. If the 1 bit is set to '0', it indicates that at least one of the codewords actually transmitted on the downlink subframe is received incorrectly or that neither of the two codewords is received.

Step 302: Divide the acknowledgement information bits into two groups so that each group includes at least one acknowledgement information bit corresponding to a really scheduled subframe.

This step may be implemented in many equivalent modes, and variations or equivalent replacements based on the embodiments of the present invention still fall within the protection scope of the present invention.

Figure 3B:
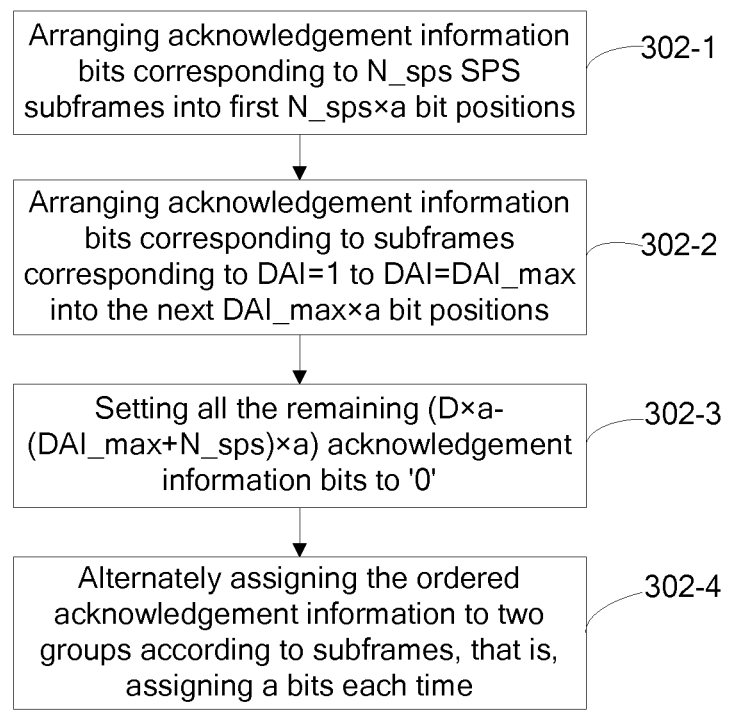
FIG. 3b is a specific flowchart for generating acknowledgement information bits on a carrier according to a solution of the third embodiment of the present invention.

Mode 1: A sequence of acknowledgement information bits of D downlink subframes on a carrier is generated according to the maximum DAI value (DAI_max) in DCI for controlling PDSCH transmission in associated subframes received by a user and the number N_sps of PDSCHs scheduled by SPS in the associated downlink subframes (generally, N_sps is equal to 0 or 1), where there are a total of D×a acknowledgement information bits. The specific process is shown in FIG. 3b, including the following steps:

Step 302-1: Arrange acknowledgement information bits corresponding to N_sps SPS subframes into first N_sps×a bit positions.

Generally, N_sps is equal to 0 or 1. A case where there is more than 1 SPS subframe is not excluded, and in such a case, the sequence of SPS subframes may be subject to a preset sequence, for example, the preset sequence is a time sequence of SPS subframes. Because the number of SPS subframes and the positions of SPS subframes are configured in advance, and are not dynamic, and are known to both a base station and a user, data scheduled by SPS is not missed.

Step 302-2: Arrange acknowledgement information bits corresponding to subframes corresponding to DAI=1 to DAI=DAI_max into the next DAI_max×a bit positions.

Those subframes with DAI should be arranged according to a definite sequence. For example, those frames are arranged according to the values of DAIS. There is a case to be described: the scheduling shown in Table 22.

TABLE 22

| | Associated Subframe | | | |
|---|---|---|---|---|
| CC | Associated Subframe 1 | Associated Subframe 2 | Associated Subframe 3 | Associated Subframe 4 |
| | DAI = 1 | DAI = 2 (missed during reception) | | DAI = 3 |

The base station schedules 3 subframes of the associated subframes, but the user receives only the subframes corresponding to DAI=1 and DAI=3. The user learns that a subframe corresponding to DAI=2 is missed, but the user does not learn whether DAI=2 is located in associated subframe 2 or associated subframe 3. In fact, this does not matter. Because the subframe corresponding to DAI=2 is missed, that is, no data is received, the corresponding a bits are all set to '0', no matter whether the missed frame is associated subframe 2 or associated subframe 3. Therefore, a bit positions between DAI=1 and DAI=3 are set to '0'. The user does not need to learn which associated subframe the missed frame is. On the other hand, the base station learns the associated subframe corresponding to DAI=2 because the scheduling is determined by the base station. Therefore, when the base station finds that a bits between DAI=1 and DAI=3 are all '0', it learns that the data of the subframe corresponding to DAI=2 is not correctly received or is completely not received by the user.

Step 302-3: Set all the remaining (D×a−(DAI_max+N_sps)×a) acknowledgement information bits to '0'. This is because all the remaining acknowledgement information bits correspond to subframes that are not actually scheduled by the base station, or those frames are scheduled by the base station but are not received by the user (missed).

Step 302-4: Alternately assign the ordered acknowledgement information to two groups according to subframes, that is, assign bits with the granularity of a each time.

It is assumed that one of the two groups to which the ordered acknowledgement information is assigned is code block a, [a(0), a(1), a(2) . . . ], and that the other group is code block b, [b(0), b(1), b(2) . . . ]. During the alternately assigning, for some carriers, the first a bits may be assigned to code block a firstly, and for some carriers, the first a bits may be assigned to code block b firstly.

In addition, when acknowledgement information of each carrier is assigned to the two groups, a sequence may be set for the carriers. For example, each carrier has a number (referred to as a cell index in LTE-A). Acknowledgement information may be assigned to the two groups in ascending order or in descending order of the numbers. Carriers supporting transmission of up to two codewords may be assigned firstly, and after all carriers supporting transmission of up to two codewords are assigned, carriers supporting transmission of up to one codeword are assigned. Of course, a sequence may be also set for the carriers supporting transmission of up to two codewords, for example, according to their numbers, and a sequence may be also set for the carriers supporting transmission of up to one codeword, for example, according to their numbers. Similarly, carriers supporting transmission of up to one codeword may be assigned firstly, and then, carriers supporting transmission of up to two codewords are assigned. Of course, a sequence may be also set for the carriers supporting transmission of up to two codewords, for example, according to their numbers, and a sequence may be also set for the carriers supporting transmission of up to one codeword, for example, according to their numbers. In theory, all these assignment modes and assignment sequences are applicable. However, in later description, it is mentioned that it should be ensured that the difference between the number of bits in one group of the two groups and the number of bits in the other group of the two groups should be at most 1. The above assignment modes and assignment sequences are more applicable to meet this requirement.

The following provides a practical example to describe the case of determining the number of subframes according to the number of associated downlink subframes determined by an HARQ time sequence relationship.

For example, two component carriers are configured for a user, and 4 downlink subframes of each carrier need to be fed back by one uplink subframe, for example, uplink subframe 2 in uplink/downlink subframe configuration 2 in Table 4. The scheduling on the base station side at the current time is shown in Table 23.

TABLE 23

| | Subframe | | | |
|---|---|---|---|---|
| Carrier | Associated Subframe 1 | Associated Subframe 2 | Associated Subframe 3 | Associated Subframe 4 |
| Carrier 1 (2 codewords) | DAI = 1 | | DAI = 2 | DAI = 3 |
| Carrier 2 (2 codewords) | | DAI = 1 | DAI = 2 | |

The user receives component carriers, and the maximum DAI received on carrier 1 is 3, and the maximum DAI received on carrier 2 is 2. Then, after being ordered according to the first arrangement mode in case 1, the acknowledgement information bits of carrier 1 and carrier 2 are shown in Table 24.

TABLE 24

| Carrier | Bit Position | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Carrier 2 (2 codewords) | DAI = 1 subframe acknowledgement information | DAI = 2 subframe acknowledgement information | 0, 0 | 0, 0 |

It is assumed that one block in the dual RM code dual RM code is code block a, [a(0), a(1), a(2) . . . ], and that the other block is code block b, [b(0), b(1), b(2) . . . ]. The ordered acknowledgement information bits in case 1 in the above example are alternately assigned to two code blocks, as shown in Table 25 or Table 26.

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | a(4), a(5) | b(4), b(5) | a(6), a(7) | b(6), b(7) |

Table 25 (in assignment mode 1, the first a bits of each carrier are assigned to code block a firstly)

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = 1 subframe acknowledgement information | DAI = 2 subframe acknowledgement information | DAI = 3 subframe acknowledgement information | 0, 0 |
| Alternate Assignment | a(0), a(1) | b(0), b(1) | a(2), a(3) | b(2), b(3) |
| Carrier 2 (2 codewords) | DAI = 1 subframe acknowledgement information | DAI = 2 subframe acknowledgement information | 0, 0 | 0, 0 |
| Alternate Assignment | b(4), b(5) | a(4), a(5) | b(6), b(7) | a(6), a(7) |

Table 26 (in assignment mode 2, in the set sequence of assigning acknowledgement information bits of carriers to two code blocks of a dual RM code, adjacent carriers alternatively assign their respective first a bits to code block a firstly or to code block b firstly)

It can be seen that if at least two downlink subframes on a component carrier have actual data transmission, that is, at least two pieces of DCI are sent in associated subframes, either of the two methods for assigning to the dual RM code (Table 9 and Table 10) may ensure that each code block of the dual RM code has acknowledgement information bits of actual data transmission; even if each carrier has only one downlink subframe that has actual data transmission, the method for assigning to the dual RM code as shown in Table 10 may also ensure that each code block has acknowledgement information bits of actual data transmission.

Some assignment modes and carrier assignment sequences above may cause the difference between the number of bits in one block of the two blocks and the number of bits in the other block of the two blocks in the dual RM mode to be more than one bit. If the difference between the number of bits in one block of the two blocks and the number of bits in the other block of the two blocks can only be 1 bit, as required by the dual RM code in the prior art, the following solutions may be adopted. The following analyzes each case.

Case 1: If the determined number of downlink subframes to be fed back is an even number, no matter how many carriers supporting up to two codewords there are and how many carriers supporting up to one codeword there are, the two parts are finally evenly assigned.

Case 2: If the determined number of downlink subframes to be fed back is an odd number, assignment mode 2 is used. If the number of carriers supporting two codewords is an even number (carriers supporting up to two codewords are firstly assigned, and then, carriers supporting up to one codeword are assigned), the carriers supporting two codewords are evenly assigned to two code blocks. In this case, no matter how many carriers supporting one codeword there are, the difference between the two code blocks is at most 1, as shown in Table 27 or Table 28.

TABLE 27

| CC | Subframe | | |
|---|---|---|---|
| | 1 | 2 | D = 3 |
| Carrier 1 (2 codewords) | Code block a | Code block b | Code block a |
| Carrier 2 (2 codewords) | Code block b | Code block a | Code block b |
| Carrier 3 (1 codeword) | Code block a | Code block b | Code block a |

TABLE 28

| CC\ | Subframe | | |
|---|---|---|---|
| | 1 | 2 | D = 3 |
| Carrier 1 (2 codewords) | Code block a | Code block b | Code block a |
| Carrier 2 (2 codewords) | Code block b | Code block a | Code block b |
| Carrier 3 (1 codeword) | Code block a | Code block b | Code block a |
| Carrier 4 (1 codeword) | Code block b | Code block a | Code block b |

If the number of carriers supporting two codewords is an odd number and the number of carriers supporting one codeword is an even number, code block a has 2 bits more than code block b, as shown in Table 29.

TABLE 29

| CC | Subframe | | |
|---|---|---|---|
| | 1 | 2 | D = 3 |
| Carrier 1 (2 codewords) | Code block a (2 bit) | Code block b (2 bit) | Code block a (2 bit) |
| Carrier 2 (1 codeword) | Code block b (1 bit) | Code block a (1 bit) | Code block b (1 bit) |
| Carrier 3 (1 codeword) | Code block a (1 bit) | Code block b (1 bit) | Code block a (1 bit) |

If the number of carriers supporting one codeword is an odd number, code block a has 1 bit more than code block b, as shown in Table 30.

TABLE 30

| CC | Subframe | | |
|---|---|---|---|
| | 1 | 2 | D = 3 |
| Carrier 1 (2 codewords) | Code block a (2 bit) | Code block b (2 bit) | Code block a (2 bit) |
| Carrier 3 (1 codeword) | Code block b (1 bit) | Code block a (1 bit) | Code block b (1 bit) |

It can be seen that an additional solution is needed only when the determined number of subframes to be fed back is an odd number and the number of carriers supporting two codewords is an odd number.

Solution 1: If the determined number of subframes to be fed back is an odd number, one is added to form an even number, and therefore, only case 1 above always exists. Then, ordering and grouping as described above can both meet the requirement. If this solution is adopted, when the number of subframes to be fed back is determined, no matter whether the number of subframes is determined according to the number of subframes associated with an HARQ time sequence relationship or the number of subframes is determined according to the DAI corresponding to the DCI for controlling PUSCH transmission, if the determined number is an odd number, the final D is equal to the odd number D plus 1. Correspondingly, the number of acknowledgement information bits to be fed back also changes, which is not further described.

Solution 2: If the determined number of subframes to be fed back is an odd number and the number of carriers supporting up to two codewords is an odd number, two acknowledgement information bits of the last subframe of each carrier after ordering are assigned to two code blocks, respectively, as shown in Table 32.

TABLE 32

| CC | Subframe | | | |
|---|---|---|---|---|
| | 1 | 2 | D = 3 | |
| Carrier 1 (2 codewords) | Code block a (2 bit) | Code block b (2 bit) | d(0) Code block a | d(1) Code block b |
| Carrier 2 (2 codewords) | Code block a (2 bit) | Code block b (2 bit) | d(0) Code block a | d(1) Code block b |
| Carrier 3 (2 codewords) | Code block a (2 bit) | Code block b (2 bit) | d(0) Code block a | d(1) Code block b |
| Carrier 4 (1 codeword) | Code block a (1 bit) | Code block b (1 bit) | Code block a (1 bit) | |
| Carrier 5 (1 codeword) | Code block b (1 bit) | Code block a (1 bit) | Code block b (1 bit) | |

Alternatively, if subframes whose quantity is an odd number and carriers whose quantity is an odd number cause the total number of subframes to be an odd number, only two codewords of the last subframe among all the subframes may be assigned to two blocks, respectively, as shown in Table 33.

TABLE 33

| CC | Subframe | | |
|---|---|---|---|
| | 1 | 2 | D = 3 |
| Carrier 1 (2 codewords) | Code block a (2 bit) | Code block b (2 bit) | Code block a (2 bit) |
| Carrier 2 (2 codewords) | Code block b (2 bit) | Code block a (2 bit) | Code block b (2 bit) |
| Carrier 3 (2 codewords) | Code block a (2 bit) | Code block b (2 bit) | d(0) Code block a d(1) Code block b |
| Carrier 4 (1 codeword) | Code block a (1 bit) | Code block b (1 bit) | Code block a (1 bit) |
| Carrier 5 (1 codeword) | Code block b (1 bit) | Code block a (1 bit) | Code block b (1 bit) |

If the difference between the number of bits in one block of the two code blocks and the number of bits in the other block of the two code blocks in the dual RM code is changed from at most 1 bit to at most 2 bits, the solution 1 and solution 2 are not needed.

Mode 2: The difference from mode 1 is as follows: When acknowledgement information bits of each carrier are ordered, the arrangement mode is that acknowledgement information bits corresponding to the PDSCH transmission in SPS scheduling that is not indicated by a DCI are arranged at the last N_sps×a bits of the D×a acknowledgement information bits on the carrier, respectively; acknowledgement information bits of downlink subframes corresponding to DAI=1 to DAI=DAI_max are arranged at the first DAI_max×a bits, respectively. The remaining (D×a−(DAI_max+N_sps)×a) bits are all set to '0'. Alternatively, the arrangement mode is that acknowledgement information bits corresponding to the PDSCH transmission in SPS scheduling that is not indicated by a DCI are arranged at the first N_sps×a bits of the D×a acknowledgement information bits on the carrier, respectively; then, acknowledgement information bits of downlink subframes corresponding to DAI=1 to DAI=DAI_max are arranged in reverse order at the last DAI_max×a bits, respectively. The remaining (D×a−(DAI_max+N_sps)×a) bits are all set to '0'. Alternatively, acknowledgement information bits corresponding to the PDSCH transmission in SPS scheduling that is not indicated by a DCI are arranged at the last N_sps×a bits of the D×a acknowledgement information bits on the carrier, respectively; then, acknowledgement information bits of downlink subframes corresponding to DAI=1 to DAI=DAI_max are arranged in reverse order at the next DAI_max×a bits, respectively. The remaining (D×a−(DAI_max+N_sps)×a) bits are all set to '0'. Alternatively, acknowledgement information bits of PDSCH transmission scheduled by SPS are arranged into any preset bit positions, then, acknowledgement information bits of downlink subframes corresponding to DAI=1 to DAI=DAI_max are arranged at the first DAI_max×a bits respectively in the remaining D×a−N_sps×a bit positions, and the remaining (D×a−(DAI_max+N_sps)×a) bits are all set to '0'.

Mode 3: In modes 1 and 2, steps that acknowledgement information is ordered and then is alternately assigned are introduced for ease of description of the implementation manners. In fact, the implementation may not be based on mode 1 or 2, but the results in essence are the same. For example, in mode 3, it is assumed that the real DAI is counted from 1. If there is a PDSCH scheduled by SPS, there is at most one PDSCH scheduled by SPS in the prior art, and SPS is pre-configured, which is known to both the base station and the user. Therefore, it may be considered that SPS corresponds to DAI=0. In this way, when carriers are assigned to two code blocks, acknowledgement information bits of downlink subframes whose DAI is an odd number are assigned to one code block, acknowledgement information bits of downlink subframes whose DAI is an even number are assigned to the other code block, and '0' is padded in proper positions in the two code blocks of the dual RM code. Note: It is possible that acknowledgement information of a downlink subframe whose DAI is an odd number in a carrier and acknowledgement information of a downlink subframe whose DAI is an even number in another carrier are assigned to a same code block.

Step 303: Encode each group of acknowledgement information bits to obtain two groups of codeword bits, respectively, and generate, from the two groups of codeword bits obtained by the encoding, total codeword bits to be transmitted.

Step 304: Perform rate matching, scrambling, modulating, and mapping on the encoded bits, and then, send the bits.

Specifically, operations such as rate matching (rate matching), scrambling (scrambling), modulating (modulate), and mapping are performed according to the corresponding requirements for transmitting the acknowledgement information on a PUCCH or PUSCH, which is not further described.

The first embodiment to the third embodiment describe about how to feed back acknowledgement information. Because the acknowledgement information is already greatly different from that in the prior art, the processing flowchart for receiving the acknowledgement information by the base station should also be different from that in the prior art. A fourth embodiment of the present invention provides a processing method for receiving acknowledgement information by a base station. It should be noted that product implementation may not be necessarily based on the following method. The following only describes how the base station side can correctly obtain acknowledgement information of each subframe.

Figure 4:
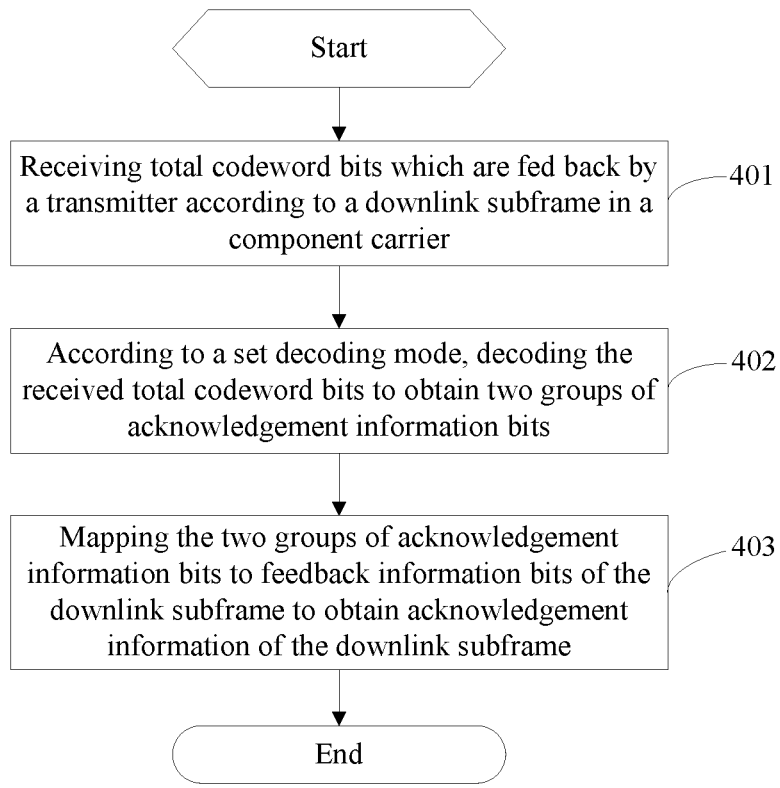
FIG. 4 is a processing flowchart for receiving acknowledgement information by a base station according to a fourth embodiment of the present invention.

The fourth embodiment of the present invention provides a processing flowchart for receiving acknowledgement information by a base station, as shown in FIG. 4, including the following steps:

Step 401: Receive total codeword bits which are fed back by according to a downlink subframe in a component carrier a transmitter.

Step 402: According to a set decoding mode, decode the received total codeword bits to obtain two groups of acknowledgement information bits.

Each group of acknowledgement information bits includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release.

Specifically, the subframes of N_sps (N_sps=0 or 1) PDSCHs scheduled by SPS are firstly arranged; then, DAI_max downlink subframes are arranged in ascending order of DAI values; and then, the remaining (D−N_sps−DAI_max) downlink subframes are arranged. DAI_max is the maximum value of a DAI in DCI that is sent by the base station and is for controlling PDSCH transmission or for indicating downlink SPS release.

Alternatively, the last N_sps×a bit positions store acknowledgement information bits corresponding to N_sps PDSCHs; the first DAI_max×a bit positions store acknowledgement information bits corresponding to downlink subframes corresponding to DCI of DAI=1 to DAI=DAI_max.

The scheduling shown in Table 34 is used as an example.

TABLE 34

| | Subframe | | | |
|---|---|---|---|---|
| Carrier | Associated Subframe 1 | Associated Subframe 2 | Associated Subframe 3 | Associated Subframe 4 |
| Carrier 1 (2 codewords) | DAI = 1 | | DAI = 2 | DAI = 3 |
| Carrier 2 (2 codewords) | | DAI = 1 | DAI = 2 | |

The number D of subframes is determined by an HARQ relationship. The subframes are ordered as shown in Table 35.

TABLE 35

| Carrier | Subframe | | | |
|---|---|---|---|---|
| Carrier 1 (2 codewords) | DAI = 1 subframe | DAI = 2 subframe | DAI = 3 subframe | Remaining subframe 1 |
| Carrier 2 (2 codewords) | DAI = 1 subframe | DAI = 2 subframe | Remaining subframe 1 | Remaining subframe 2 |

Step 403: Map the two groups of acknowledgement information bits to feedback information bits of the downlink subframes to obtain acknowledgement information of the downlink subframe.

Specifically, it is assumed that the obtained two groups of acknowledgement information bits are a(0), a(1), . . . and b(0), b(1), . . . , respectively. The two groups of acknowledgement information bits are alternately mapped to the ordered subframes, as shown in Table 36.

TABLE 36

| Carrier | Subframe | | | |
|---|---|---|---|---|
| Carrier 1 (2 codewords) | DAI = 1 subframe a(0), a(1) | DAI = 2 subframe b(0), b(1) | DAI = 3 subframe a(2), a(3) | Remaining subframe 1 b(2), b(3) |
| Carrier 2 (2 codewords) | DAI = 1 subframe b(4), b(5) | DAI = 2 subframe a(4), a(5) | Remaining subframe 1 b(6), b(7) | Remaining subframe 2 a(6), a(7) |

After the alternately mapping, the base station obtains acknowledgement information of each scheduled downlink subframe. For example, the acknowledgement information of a subframe of DAI=1 is a(0) and a(1). According to the values of a(0) and a(1), the base station learns the reception of data transmitted on the downlink subframe of DAI=1 on a user side.

The base station learns which subframes have no actual data transmission, for example, the remaining subframe 1 above, and learns that the corresponding acknowledgement information bits are all set to '0'. In fact, the base station does not need to care about the value of the acknowledgement information of the remaining subframe, and only needs to care about the acknowledgement information of the subframes having actual data transmission. The remaining subframe only serves the purpose of occupying a position so that the correspondence between subframes and acknowledgement information is correct (also applicable to the preceding embodiments). For example, if only acknowledgement information of actual data transmission is arranged, because a user may miss a frame during reception, the subframes which are received by the user and have actual data transmission are inconsistent with the subframes which are sent by the base station and have actual data transmission. Therefore, the arrangement performed by the user according to the actual data transmission received is inconsistent with the arrangement performed by the base station according to the actual data transmission sent. In this way, the base station may be unable to accurately obtain acknowledgement information of each downlink subframe that has actual data transmission.

It is noted that the DAI_max used by the base station may be different from the DAI_max used by the user. If the two are different, what kind of impact may be caused to the solutions of the present invention? The following provides examples for description.

It is assumed that the scheduling on the base station side is shown in Table 37.

TABLE 37

| Carrier | Subframe | | | |
|---|---|---|---|---|
| | Associated Subframe 1 | Associated Subframe 2 | Associated Subframe 3 | Associated Subframe 4 |
| Carrier 1 (2 codewords) | DAI = 1 | | DAI = 2 | DAI = 3 |
| Carrier 2 (2 codewords) | DAI = 1 | DAI = 2 | DAI = 3 | |

However, the user does not receive DAI=3 on carrier 2. Therefore, DAI_max=2, and the ordering performed by the user is shown in Table 38.

TABLE 37

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) Code block | DAI = subframe a(0), a(1) | DAI = 2 subframe b2(0), b2(1) | DAI = 3 subframe a(2), a(3) | 0, 0 b(2), b(3) |
| Carrier 2 (2 codewords) Code block | DAI = 1 subframe b(4), b(5) | DAI = 2 subframe a(4), a(5) | 0, 0 b(6), b(7) | 0, 0 a(6), a(7) |

The base station assumes that all the users receive. The simulated ordering and assignment are shown in Table 38.

TABLE 38

| Carrier | Subframe | | | |
|---|---|---|---|---|
| | 2 Bits (1, 2) | 2 Bits (3, 4) | 2 Bits (5, 6) | 2 Bits (7, 8) |
| Carrier 1 (2 codewords) | DAI = subframe a(0), a(1) | DAI = 2 subframe b(0), b(1) | DAI = 3 subframe a(2), a(3) | 0, 0 b(2), b(3) |
| Carrier 2 (2 codewords) | DAI = 1 subframe b(4), b(5) | DAI = 2 subframe a(4), a(5) | DAI = 3 subframe b(6), b(7) | 0, 0 a(6), a(7) |

Because the user does not receive DAI=3, the base station considers that the bits b(6) and b(7) in the position of DAI=3 are set to '0'. When the base station receives '0' in this position, the base station learns that the user incorrectly receives the subframe of DAI=3 or the user does not receive the subframe of DAI=3. It can be seen that though there is a little difference, the difference has no impact. If the user does not receive the subframe of DAI=3, the acknowledgement information generated should be '0'.

A fifth embodiment of the present invention provides an apparatus for encoding acknowledgement information, where the apparatus is configured to execute the method steps described in the above embodiments and the apparatus is located in a user equipment and includes:

an acknowledgement information generating module, configured to receive a component carrier, where the component carrier includes at least one downlink subframe, and generate acknowledgement information bits corresponding to the component carrier according to the received component carrier;

a grouping module, configured to divide the acknowledgement information bits generated by the acknowledgement information generating module into two groups so that each group includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and an encoding module, configured to encode the two groups of acknowledgement information bits divided by the grouping module to obtain two groups of codeword bits, respectively, and generate, from the two groups of codeword bits obtained by the encoding, total codeword bits to be transmitted.

Figure 5:
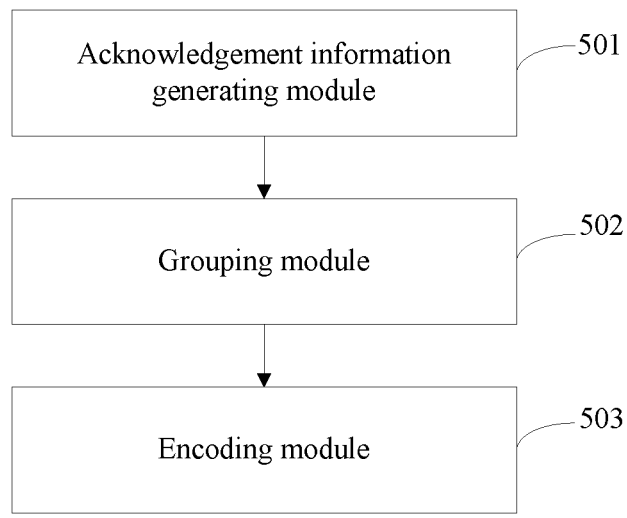
FIG. 5 is an apparatus for encoding acknowledgement information according to an embodiment of the present invention.

As shown in FIG. 5, in another implementation manner of an apparatus for encoding acknowledgement information according to an embodiment of the present invention, the apparatus may include:

an acknowledgement information generating module 501, configured to receive at least one component carrier, where each component carrier in the at least one component carrier includes at least one downlink subframe, and generate acknowledgement information bits corresponding to each of the component carriers according to each of the component carriers;

a grouping module 502, configured to order the acknowledgement information bits corresponding to each of the component carriers according to a maximum value DAI_max of a downlink assignment index DAI field in downlink control information DCI which is received on each of the component carriers and used for controlling physical downlink shared channel PDSCH transmission and/or indicating downlink semi-persistent scheduling SPS release and the number N_sps of physical downlink shared channels PDSCHs scheduled by semi-persistent scheduling SPS in the at least one downlink subframe, alternately assign the ordered acknowledgement information bits corresponding to each of the component carriers to two groups, to obtain two groups of acknowledgement information bits; and an encoding module 503, configured to encode the two divided groups of acknowledgement information bits to obtain two groups of codeword bits, respectively, and generate, from the two groups of codeword bits obtained by the encoding, total codeword bits to be transmitted.

Preferably, the apparatus further includes:

a downlink subframe number determining module, configured to determine the number D of downlink subframes for which the acknowledgement information bits need to be generated, and send the determined number of downlink subframes to the acknowledgement information generating module.

Preferably, the downlink subframe number determining module includes a first downlink subframe number determining unit or a second downlink subframe number determining unit, where:

the first downlink subframe number determining unit is configured to determine the number D of downlink subframes according to the number of downlink subframes associated with a hybrid automatic repeat request HARQ time sequence;

the second downlink subframe number determining unit is configured to determine the number D of downlink subframes according to a value of a downlink assignment index DAI field in downlink control information DCI for controlling physical uplink shared channel PUSCH transmission.

Preferably, the acknowledgement information generating module includes:

a carrier configuration information obtaining unit, configured to obtain the maximum number of codewords that the component carrier is configured to support in transmission and whether a bundling mode is used between codewords; and an acknowledgement information bit generating unit, configured to determine, according to the maximum number of codewords that the component carrier is configured to support in transmission and whether a bundling mode is used between codewords, the bit number a of acknowledgement information bits corresponding to each downlink subframe, where the maximum number of codewords and whether a bundling mode is used between codewords are obtained by the carrier configuration information obtaining unit.

Preferably, the grouping module includes:

an ordering unit, configured to order the acknowledgement information bits according to a maximum value DAI_max of a DAI field in received DCI used for controlling PDSCH transmission and/or indicating downlink SPS release and the number N_sps of physical downlink shared channels PDSCHs scheduled by semi-persistent scheduling SPS in the downlink subframes; and an assigning unit, configured to alternately assign the acknowledgement information bits ordered by the ordering unit to the two groups.

Preferably, the ordering unit further includes:

a first ordering subunit, configured to place acknowledgement information bits corresponding to N_sps PDSCHs into first N_sps×a bit positions;

a second ordering subunit, configured to place acknowledgement information bits corresponding to downlink subframes corresponding to DCI of DAI=1 to DAI=DAI_max into bit positions N_sps×a+1 to N_sps×a+DAI_max×a; and a third ordering subunit, configured to set the remaining (D×a−(DAI_max+N_sps)×a) acknowledgement information bits to '0';

or, the ordering unit further includes:

a fourth ordering subunit, configured to place acknowledgement information bits corresponding to N_sps PDSCHs into last N_sps×a bit positions;

a fifth ordering subunit, configured to place acknowledgement information bits corresponding to downlink subframes corresponding to DCI of DAI=1 to DAI=DAI_max into first DAI_max×a bit positions; and a sixth ordering subunit, configured to set the remaining (D×a−(DAI_max+N_sps)×a) acknowledgement information bits to '0'.

Preferably, the assigning unit includes:

a subgroup dividing unit, configured to evenly divide the ordered acknowledgement information bits into D subgroups.

The assigning unit further includes: a first assigning subunit, configured to assign a subgroup having an odd subgroup number to a first group of the two groups, and assign a subgroup having an even subgroup number to a second group of the two groups; and/or a second assigning subunit, configured to assign a subgroups having an even subgroup number to a first group of the two groups, and assign a subgroup having an odd subgroup number to a second group of the two groups.

Preferably, when the component carrier includes multiple carriers, the assigning unit alternately uses the first assigning subunit and the second assigning subunit for the ordered acknowledgement information corresponding to each of the component carriers according to a set sequence of arranging component carriers.

Preferably, if the actual number of downlink subframes determined by the downlink subframe number determining module is an odd number, 1 is added to the actual number of downlink subframes to obtain a sum used as the number D of downlink subframes.

Preferably, the assigning unit further includes a third assigning subunit, configured to: when the component carrier includes multiple carriers, and the D is an odd number, and in the component carriers, the number of component carriers b in which each downlink subframe corresponds to 2 acknowledgement information bits is an odd number, assign last two acknowledgement information bits of the ordered acknowledgement information bits corresponding to each of the component carriers b to the two groups, respectively; or assign last two acknowledgement information bits of acknowledgement information bits of a last component carrier b in the component carriers to the two groups, respectively, where the component carriers are arranged according to a set sequence.

Preferably, the grouping module is configured to:

according to received DCI used for controlling PDSCH transmission and/or indicating downlink SPS release, assign acknowledgement information bits corresponding to a downlink subframe corresponding to an odd-number value of a DAI field in the received DCI to a first group of the two groups, and assign acknowledgement information bits corresponding to a downlink subframe corresponding to an even-number value of the DAI field to a second group of the two groups.

Alternatively, the acknowledgement information generating module is further specifically configured to generate acknowledgement information bits corresponding to a first codeword and a second codeword transmitted on each downlink subframe in each of the component carriers, and map the acknowledgement information bits corresponding to the first codeword and the second codeword transmitted on each downlink subframe to two acknowledgement information bits d(0) and d(1), respectively, so that when only one codeword is transmitted on at least one first downlink subframe in each of the component carriers, acknowledgement information bits corresponding to one codeword transmitted on the at least one first downlink subframe are mapped to d(0), and/or so that when only one codeword is transmitted on at least one second downlink subframe in each of the component carriers, acknowledgement information bits corresponding to one codeword transmitted on the at least one second downlink subframe are mapped to d(1).

A sixth embodiment of the present invention provides an apparatus for processing acknowledgement information, where the apparatus is configured to execute the method steps described in the above embodiments and the apparatus is located in a base station and includes:

a receiving module, configured to receive total codeword bits which are fed back according to a downlink subframe in a component carrier by a transmitter;

a decoding module, configured to decode the received total codeword bits according to a set decoding mode to obtain two groups of acknowledgement information bits, where each group of acknowledgement information bits includes at least one acknowledgement information bit, where the at least one acknowledgement information bit corresponds to physical downlink shared channel PDSCH transmission and/or downlink control information DCI, where the DCI is used for indicating downlink semi-persistent scheduling SPS release; and a mapping module, configured to map the two groups of acknowledgement information bits obtained by the decoding module to feedback information bits of the downlink subframes to obtain acknowledgement information of the downlink subframe.

Figure 6:
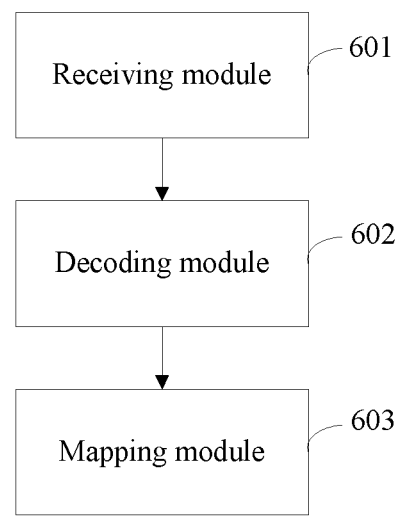
FIG. 6 is an apparatus for processing acknowledgement information according to the fourth embodiment of the present invention.

As shown in FIG. 6, in another implementation manner of an apparatus for processing acknowledgement information according to an embodiment of the present invention, the apparatus may include:

a receiving module 601, configured to receive total codeword bits fed back by a transmitter;

where the total codeword bits are generated from two groups of codeword bits, and the two groups of codeword bits are obtained by encoding two groups of acknowledgement information bits by the transmitter, respectively;

where the two groups of acknowledgement information bits are obtained in the following way: receiving, by the transmitter, at least one component carrier, and generating acknowledgement information bits corresponding to each component carrier in the at least one component carrier; ordering the acknowledgement information bits corresponding to each of the component carriers according to a maximum value DAI_max of a downlink assignment index DAI field in downlink control information DCI which is obtained on each of the component carriers and used for controlling physical downlink shared channel PDSCH transmission and/or indicating downlink semi-persistent scheduling SPS release and the number N_sps of physical downlink shared channels PDSCHs scheduled by semi-persistent scheduling SPS in the at least one downlink subframe of each of the component carriers; and alternately assigning the ordered acknowledgement information bits corresponding to each of the component carriers to two groups;

a decoding module 602, configured to decode the received total codeword bits according to a set decoding mode to obtain the two groups of acknowledgement information bits; and a mapping module 603, configured to map the two groups of acknowledgement information bits to feedback information bits of the at least one downlink subframe to obtain acknowledgement information of the at least one downlink subframe.

Preferably, in the feedback information bits of the downlink subframe which are obtained by mapping by the mapping module:

first $N\_sps \times a$ bit positions store acknowledgement information bits corresponding to $N\_sps$ PDSCHs; and bit positions $N\_sps \times a + 1$ to $N\_sps \times a + DAI\_max \times a$ store acknowledgement information bits corresponding to downlink subframes corresponding to DCI of DAI=1 to DAI=DAI_max;

or last $N\_sps \times a$ bit positions store acknowledgement information bits corresponding to $N\_sps$ PDSCHs; and first $DAI\_max \times a$ bit positions store acknowledgement information bits corresponding to downlink subframes corresponding to DCI of DAI=1 to DAI=DAI_max.

N_sps is the number of physical downlink shared channels PDSCHs scheduled by semi-persistent scheduling SPS in the downlink subframes, the DCI is used for controlling PDSCH transmission and/or indicating downlink SPS release, the downlink assignment index DAI field is located in the DCI, and a is the bit number of acknowledgement information bits corresponding to each downlink subframe.

It is understandable by those skilled in the art that for ease and brevity of description, for the specific working processes of the preceding system, apparatus, and units, reference may be made to the corresponding processes in the method embodiments and details are not further described herein.

The processing flowchart for feeding back acknowledgement information according to a seventh embodiment of the present invention is as follows:

Step 701: Generate acknowledgement information bits of a component carrier according to the number of downlink subframes whose acknowledgement information needs to be fed back by an uplink subframe and reception of downlink data, where, for at least one downlink subframe for which two acknowledgement information bits d(0) and d(1) need to be generated, if only one codeword is transmitted, the acknowledgement information corresponding to the one codeword corresponds to bit d(0); for at least one downlink subframe for which two acknowledgement information bits d(0) and d(1) need to be generated, if only one codeword is transmitted, the acknowledgement information corresponding to the one codeword corresponds to bit d(1).

Specifically, the number D of downlink subframes whose acknowledgement information needs to be fed back by the uplink subframe may be determined by using the method of the first embodiment according to the number of associated downlink subframes determined by various HARQ relationships in Uplink/Downlink Configuration Table 4, or determined by using the method of the second embodiment according to the value of the DAI in the DCI for controlling uplink PUSCH transmission.

Generating acknowledgement information bits includes: determining, according to the number of codewords that the component carrier is configured to support in transmission and whether a bundling mode is used between codewords, the number of acknowledgement information bits to be fed back with respect to each downlink subframe.

Specifically, if the number of codewords that can be transmitted on a carrier is 1, 1 acknowledgement information bit d(0) needs to be fed back with respect to each downlink subframe on the carrier. For the 1 bit d(0), the value '1' indicates correct reception of data transmitted on a downlink subframe; and the value '0' indicates incorrect reception of data transmitted on the downlink subframe or failure to receive any data on the downlink subframe, or vice versa. Herein, the data refers to PDSCH transmission or downlink control information (Downlink Control Information, DCI) used for indicating downlink semi-persistent scheduling (Semi-persistent Scheduling, SPS) release (Release).

If the number of codewords that can be transmitted on a carrier is 2 and no spatial bundling (spatial bundling) mode is configured between the two codewords, 1 bit needs to be fed back with respect to each codeword of each downlink subframe on the carrier and a total of 2 acknowledgement information bits d(0) and d(1) are needed. For 1 bit of the 2 bits, the value '1' indicates correct reception of data transmission of one codeword on a downlink subframe; and the value '0' indicates incorrect reception of data transmission of one codeword on the downlink subframe, or failure to receive data of one codeword on the downlink subframe, or vice versa. For the other 1 bit, the value '1' indicates correct reception of data transmission of the other codeword on the downlink subframe; and the value '0' indicates incorrect reception of data transmission of the other codeword on the downlink subframe, or failure to receive data of the other codeword on the downlink subframe, or vice versa. For example, d(0) corresponds to the acknowledgement information bit of a first codeword, and d(1) corresponds to the acknowledgement information bit of a second codeword. In particular, although a carrier is configured to support 2 codewords in transmission, in fact, sometimes, only one codeword may be transmitted on a subframe. For example, the subframe is used for PDSCH data transmission scheduled by SPS, or a codeword incorrectly received previously is transmitted on the subframe, or the subframe has no PDSCH transmission, but the subframe has only the CDI corresponding to downlink SPS release (although this case is not completely the same as the concept of a codeword, only 1-bit acknowledgement information needs to be fed back, which is considered to correspond to one codeword). In this case, when the acknowledgement information of the codeword corresponds to d(0) and d(1), according to a set rule, for at least one downlink subframe for which two acknowledgement information bits need to be generated, if only one codeword is transmitted, the acknowledgement information corresponding to the one codeword corresponds to bit d(0); for at least one downlink subframe for which two acknowledgement information bits need to be generated, if only one codeword is transmitted, the acknowledgement information corresponding to the one codeword corresponds to bit d(1). For example, there are a total of 4 downlink subframes: downlink subframes 1, 2, 3, and 4. According to the set rule, only one codeword is transmitted on the downlink subframe 1, and the acknowledgement information corresponding to the one codeword corresponds to bit d(0); only one codeword is transmitted on the downlink subframe 2, and the acknowledgement information corresponding to the one codeword corresponds to bit d(1); only one codeword is transmitted on the downlink subframe 3, and the acknowledgement information corresponding to the one codeword corresponds to bit d(0); and only one codeword is transmitted on the downlink subframe 4, and the acknowledgement information corresponding to the one codeword corresponds to bit d(1). If it is considered that the other codeword is not received, the other bit d(1) or d(0) is correspondingly set to '0'. Apparently, if PDSCH transmission or DCI indicating downlink SPS release is not received, the values of the two bits d(0) and d(1) are both set to '0'.

If the number of codewords that can be transmitted on a carrier is 2 but a spatial bundling mode is configured between the two codewords, only 1 bundled acknowledgement information bit d(0) needs to be fed back with respect to each downlink subframe on the carrier. If the 1 bit is set to '1', it indicates correct reception of all codewords actually transmitted on the downlink subframe. Specifically, if one codeword is transmitted actually (including one codeword in the PDSCH or only the DCI indicating downlink SPS release), the codeword is received correctly; and if two codewords are transmitted actually, the two codewords are received correctly. If the 1 bit is set to '0', it indicates that data transmission of at least one of the codewords actually transmitted on the downlink subframe is received incorrectly or that none of data of the two codewords is received on the downlink subframe.

In this way, a user equipment finally determines, according to the determined number D of downlink subframes and the number a (a=1 or a=2) of acknowledgement information bits that need to be fed back with respect to each downlink subframe, the total number D×a of acknowledgement information bits finally generated with respect to each downlink component carrier.

Step 702: Order the acknowledgement information bits of D downlink subframes of the downlink carrier to obtain an acknowledgement information bit sequence to be sent.

Specifically, it is assumed that there are M downlink carriers, and that acknowledgement information of D downlink subframes needs to be fed back on the same uplink subframe. Firstly, acknowledgement information bits corresponding to D downlink subframes of a first downlink carrier are arranged, and then, acknowledgement information bits corresponding to D downlink subframes of a second downlink carrier are arranged, and so on, until acknowledgement information bits corresponding to downlink subframes of all downlink carriers are arranged.

For example, 2 downlink carriers are configured for a user, and 4 downlink subframes on each downlink carrier correspond to the same uplink subframe. For each carrier, it is assumed that a transmission mode is transmission of two codewords (codeword). The case of any other quantity of codewords is similar thereto. Herein, each codeword uses one bit to indicate acknowledgement information of the codeword (without spatial bundling). In this example, 4*2=8 acknowledgement information bits need to be fed back with respect to each carrier, and a total of 16 acknowledgement information bits, namely, a sequence [a(0), a(1), . . . , a(15)], need to be fed back with respect to two carriers.

After the ordering, the correspondence between a(i) in the sequence and acknowledgement information of a downlink subframe on a downlink carrier is shown in Table 39, where two acknowledgement information bits d(0) and d(1) corresponding to each downlink subframe correspond to bits a(2i) and a(2i+1), respectively.

TABLE 39

|  | Downlink Subframe 1 | Downlink Subframe 2 | Downlink Subframe 3 | Downlink Subframe 4 |
| --- | --- | --- | --- | --- |
| Carrier 1 (2 codewords) | a(0), a(1) | a(2), a(3) | a(4), a(5) | a(6), a(7) |
| Carrier 2 (2 codewords) | a(8), a(9) | a(10), a(11) | a(12), a(13) | a(14), a(15) |

Step 703: Divide bits of the obtained acknowledgement information bit sequence to be sent into two groups, where acknowledgement information bits in odd positions are assigned to a first group, and acknowledgement information bits in even positions are assigned to a second group.

Specifically, in the acknowledgement information bit sequence [a(0), a(1), . . . , a(15)] obtained in the above example, [a(0), a(2), . . . , a(14)] form the first group, and [a(2), a(3), . . . , a(15)] form the second group. It should be noted that the first group and the second group are only used for distinguishing two groups rather than limiting the sequence of the two groups.

Step 704: Encode each group of acknowledgement information bit sequences.

Step 705: Perform rate matching on the encoded bits, perform mapping, and send the bits.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in each embodiment of the present invention may be integrated into a processing unit, or each of the units may exist alone physically, or two or more units may be integrated into a unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be implemented in the form of software product. The computer software product is stored in a storage medium and includes several instructions for instructing a computer device (which may be a personal computer, a server, a processor, a network device, or the like) to perform all or a part of steps of the method described in each embodiment of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing description is merely about the specific embodiments of the present invention, but is not intended to limit the protection scope of the present invention. Any equivalent modification or replacement figured out by persons skilled in the art within the technical scope of the present invention shall fall within the protection scope of the present invention. Therefore, the protection scope of the present invention shall be subject to the protection scope of the claims.

What is claimed is:

1. A method for encoding acknowledgement information, comprising:
generating acknowledgement information bits corresponding to each component carrier in at least one component carrier, wherein the each component carrier in the at least one component carrier comprises at least one downlink subframe;
ordering the acknowledgement information bits as following:
placing acknowledgement information bits into last N_sps×a bit positions, with the acknowledgement information bits corresponding to N_sps physical downlink shared channels (PDSCHs) scheduled by semi-persistent scheduling, wherein N_sps indicates the number of PDSCHs scheduled by downlink semi-persistent scheduling (SPS) in the at least one downlink subframe;
placing acknowledgement information bits into first DAI_max×a bit positions, with the acknowledgement information bits corresponding to downlink subframes corresponding to downlink control information (DCI) of DAI=1 to DAI=DAI_max, wherein the DAI indicates value of a downlink assignment index (DAI) field in DCI which is received on the each component carrier and used for controlling PDSCH transmission or indicating SPS release, DAI_max indicates a maximum value of the DAI field in DCI; and
setting the remaining (D×a−(DAI_max+N_sps)×a) acknowledgement information bits to '0';
wherein the a is a bit number of acknowledgement information bits corresponding to each of the downlink subframes and the D is a number of downlink subframes for which the acknowledgement information bits need to be generated;

alternately assigning the ordered acknowledgement information bits corresponding to the each component carrier to two groups and obtaining two groups of acknowledgement information bits;

encoding the two groups of acknowledgement information bits to obtain two groups of codeword bits, respectively, and generating a total codeword bits to be transmitted from the two groups of codeword bits; and transmitting the total codeword bits to a receiver.

2. The method according to claim 1, wherein the alternately assigning is based on granularity of a bit.

3. The method according to claim 1, wherein the alternately assigning comprises:

assigning the ordered acknowledgement information bits corresponding to the each component carrier in the at least one component carrier to the two groups in ascending order of carrier numbers of the at least one component carrier.

4. The method according to claim 1, wherein the alternately assigning comprises:

assigning the ordered acknowledgement information bits corresponding to the each component carrier in the at least one component carrier to the two groups in descending order of carrier numbers of the at least one component carrier.

5. The method according to claim 1, wherein before the generating the acknowledgement information bits of a downlink component carrier, the method further comprises:

determining the number D of downlink subframes for which the acknowledgement information bits need to be generated.

6. A method for processing acknowledgement information, comprising:

receiving, by a receiver, total codeword bits fed back by a transmitter, wherein the total codeword bits are generated from two groups of codeword bits, and the two groups of codeword bits are obtained by encoding two groups of acknowledgement information bits, respectively;

decoding, by the receiver according to a set decoding mode, the received total codeword bits to obtain the two groups of acknowledgement information bits; and mapping, by the receiver, the two groups of acknowledgement information bits to feedback information bits of the at least one downlink subframe to obtain acknowledgement information of the at least one downlink subframe;

wherein:

last N_sps×a bit positions of the feedback information bits of the at least one downlink subframe store acknowledgement information bits corresponding to N_sps physical downlink shared channels (PDSCHs), wherein N_sps indicates the number of PDSCHs scheduled by downlink semi-persistent scheduling (SPS) in the at least one downlink subframe; and first DAI_max×a bit positions of the feedback information bits of the at least one downlink subframe store acknowledgement information bits corresponding to downlink subframes corresponding to downlink control information (DCI) of DAI=1 to DAI=DAI_max, wherein the DAI indicates value of a downlink assignment index (DAI) field in DCI which is received on the each component carrier and used for controlling PDSCH transmission or indicating SPS release, DAI_max indicates a maximum value of the DAI field in DCI;

wherein the a is a bit number of acknowledgement information bits corresponding to each of the downlink subframes.

7. The method according to claim 6, wherein the two groups of codeword bits are obtained by alternately assigning ordered acknowledgement information bits corresponding to the each component carrier to corresponding to two groups.

8. The method according to claim 7, wherein alternately assigning is based on granularity of a bit.

9. The method according to claim 7, wherein the alternately assigning comprises:

assigning the ordered acknowledgement information bits corresponding to the each component carrier in the at least one component carrier to the two groups in ascending or descending order of carrier numbers of the at least one component carrier.

10. An apparatus for encoding acknowledgement information, comprising:

an acknowledgement information generating module configured to generate acknowledgement information bits corresponding to each component carrier in at least one component carrier, wherein the each component carrier in the at least one component carrier comprises at least one downlink subframe;

a grouping module configured to:

order the acknowledgement information bits corresponding to the each component carrier;

alternately assign the ordered acknowledgement information bits corresponding to the each component carrier to two groups of acknowledgement information bits; and obtain two groups of acknowledgement information bits; and an encoding module configured to:

encode the two groups of acknowledgement information bits to obtain two groups of codeword bits, respectively; and generate, from the two groups of codeword bits obtained by the encoding, a total codeword bits to be transmitted;

wherein the grouping module comprises an ordering unit configured to:

place acknowledgement information bits into last N_sps×a bit positions, with the acknowledgement information bits corresponding to N_sps physical downlink shared channels (PDSCHs) scheduled by semi-persistent scheduling, wherein N_sps indicates the number of PDSCHs scheduled by downlink semi-persistent scheduling (SPS) in the at least one downlink subframe;

place acknowledgement information bits into first DAI_max×a bit positions, with the acknowledgment information bits corresponding to downlink subframes corresponding to downlink control information (DCI) of DAI=1 to DAI=DAI_max wherein the DAI indicates value of a downlink assignment index (DAI) field in DCI which is received on the each component carrier and used for controlling PDSCH transmission or indicating SPS release, DAI_max indicates a maximum value of the DAI field in DCI; and set the remaining (D×a−(DAI_max+N_sps)×a) acknowledgement information bits to '0';

wherein the a is a bit number of acknowledgement information bits corresponding to the each downlink subframe and the D is the number of downlink subframes for which the acknowledgement information bits need to be generated.

11. The apparatus according to claim 10, wherein the alternately assigning is based on granularity of a bit.

12. The apparatus according to claim 10, wherein the alternately assigning comprises:
   assigning the ordered acknowledgement information bits corresponding to the each component carrier in the at least one component carrier to the two groups in ascending or descending order of carrier numbers of the at least one component carrier.

13. The apparatus according to claim 10, further comprising:
   a downlink subframe number determining module, configured to determine a number D of downlink subframes for which the acknowledgement information bits need to be generated, and send the determined number of downlink subframes to the acknowledgement information generating module.

14. An apparatus for processing acknowledgement information, comprising:
   a receiving module configured to receive total codeword bits fed back by a transmitter, wherein the total codeword bits are generated from two groups of codeword bits, and the two groups of codeword bits are obtained by encoding two groups of acknowledgement information bits by the transmitter, respectively;
   a decoding module configured to decode, the received total codeword bits to obtain the two groups of acknowledgement information bits; and
   a mapping module configured to map the two groups of acknowledgement information bits to feedback information bits of the at least one downlink subframe to obtain acknowledgement information of the at least one downlink subframe;
   wherein:
      last N_sps×a bit positions of the feedback information bits of the at least one downlink subframe store acknowledgement information bits corresponding to N_sps physical downlink shared channels (PDSCHs), wherein N_sps indicates the number of PDSCHs scheduled by downlink semi-persistent scheduling (SPS) in the at least one downlink subframe; and
      first DAI_max×a bit positions of the feedback information bits of the at least one downlink subframe store acknowledgement information bits corresponding to downlink subframes corresponding to downlink control information (DCI) of DAI=1 to DAI=DAI_max, wherein the DAI indicates value of a downlink assignment index (DAI) field in DCI which is received on the each component carrier and used for controlling PDSCH transmission or indicating SPS release, DAI_max indicates a maximum value of the DAI field in DCI;
      wherein the a is a bit number of acknowledgement information bits corresponding to each of the downlink subframes.

15. The apparatus according to claim 14, wherein the decoding module is configured to decode, according to a set decoding mode, the received total codeword bits to obtain the two groups of acknowledgement information bits.

16. The method according to claim 14, wherein the two groups of codeword bits are obtained by alternately assigning ordered acknowledgement information bits corresponding to the each component carrier to corresponding to two groups.

17. The apparatus according to claim 16, wherein the alternately assigning is based on granularity of a bit.

18. The apparatus according to claim 16, wherein the alternately assigning comprises:
   assigning the ordered acknowledgement information bits corresponding to the each component carrier in the at least one component carrier to the two groups in ascending or descending order of carrier numbers of the at least one component carrier.

19. A non-transitory computer readable storage medium, comprising computer program codes which when executed by a computer processor cause the compute processor to execute the steps of:
   generating acknowledgement information bits corresponding to each component carrier in at least one component carrier, wherein the each component carrier in the at least one component carrier comprises at least one downlink subframe;
   ordering the acknowledgement information bits as following:
      placing acknowledgement information bits into last N_sps×a bit positions, with the acknowledgement information bits corresponding to N_sps physical downlink shared channels (PDSCHs) scheduled by semi-persistent scheduling, wherein N_sps indicates the number of PDSCHs scheduled by downlink semi-persistent scheduling (SPS) in the at least one downlink subframe;
      placing acknowledgement information bits into first DAI_max×a bit positions, with the acknowledgement information bits corresponding to downlink subframes corresponding to downlink control information (DCI) of DAI=1 to DAI=DAI_max, wherein the DAI indicates value of a downlink assignment index (DAI) field in DCI which is received on the each component carrier and used for controlling PDSCH transmission or indicating SPS release, DAI_max indicates a maximum value of the DAI field in DCI; and
      setting the remaining (D×a−(DAI_max+N_sps)×a) acknowledgement information bits to '0';
      wherein the a is a bit number of acknowledgement information bits corresponding to each of the downlink subframes and the D is a number of downlink subframes for which the acknowledgement information bits need to be generated;
   alternately assigning the ordered acknowledgement information bits corresponding to the each component carrier to two groups and obtaining two groups of acknowledgement information bits; and
   encoding the two groups of acknowledgement information bits to obtain two groups of codeword bits, respectively, and generating a total codeword bits to be transmitted from the two groups of codeword bits.

20. A non-transitory computer readable storage medium, comprising computer program codes which when executed by a computer processor cause the compute processor to execute the steps of:
   receiving, by a receiver, total codeword bits fed back by a transmitter, wherein the total codeword bits are generated from two groups of codeword bits, and the two groups of codeword bits are obtained by encoding two groups of acknowledgement information bits by the transmitter, respectively;

decoding, by the receiver according to a set decoding mode, the received total codeword bits to obtain the two groups of acknowledgement information bits; and mapping, by the receiver, the two groups of acknowledgement information bits to feedback information bits of the at least one downlink subframe to obtain acknowledgement information of the at least one downlink subframe;

wherein:

last N_sps×a bit positions of the feedback information bits of the at least one downlink subframe store acknowledgement information bits corresponding to N_sps physical downlink shared channels (PDSCHs), wherein N_sps indicates the number of PDSCHs scheduled by downlink semi-persistent scheduling (SPS) in the at least one downlink subframe; and first DAI_max×a bit positions of the feedback information bits of the at least one downlink subframe store acknowledgement information bits corresponding to downlink subframes corresponding to downlink control information (DCI) of DAI=1 to DAI=DAI_max, wherein the DAI indicates value of a downlink assignment index (DAI) field in DCI which is received on the each component carrier and used for controlling PDSCH transmission or indicating SPS release, DAI_max indicates a maximum value of the DAI field in DCI;

wherein the a is a bit number of acknowledgement information bits corresponding to each of the downlink subframes.

* * * * *

UNITED STATES PATENT AND TRADEMARK OFFICE
CERTIFICATE OF CORRECTION

PATENT NO. : 10,715,295 B2
APPLICATION NO. : 16/224523
DATED : July 14, 2020
INVENTOR(S) : Fan et al.

It is certified that error appears in the above-identified patent and that said Letters Patent is hereby corrected as shown below:

In the Specification

Column 18, Line 34: replace "RM code dual RM code is" with --RM code is--
Column 19, Line 13: replace "block in the dual RM code dual RM" with --block in the dual RM--
Column 26, Line 29: replace "of a dual RM code dual RM code." with --of a dual RM.--
Column 26, Line 30: replace "in the dual RM code dual RM" with --in the dual RM--
Column 28, Line 25: replace "in the dual RM code dual RM" with --in the dual RM--
Column 33, Line 21: replace "in the dual RM code dual RM" with --in the dual RM--

In the Claims

Column 50, Claim 8, Line 11: replace "wherein alternately" with --wherein the alternately--

Signed and Sealed this
Twenty-fifth Day of October, 2022

Katherine Kelly Vidal
*Director of the United States Patent and Trademark Office*